United States Patent
Selvaraj et al.

(10) Patent No.: US 12,541,881 B1
(45) Date of Patent: Feb. 3, 2026

(54) MANAGING OPERATION OF A DISPLAY FREE BODY WEARABLE COMPUTING DEVICE

(71) Applicant: Dell Products L.P., Round Rock, TX (US)

(72) Inventors: Prabu Selvaraj, Singapore (SG); Yan Yan, Singapore (SG); Si Fi Faye Li, Singapore (SG); Chin Leong Ong, Singapore (SG); Seungmi Lee, Singapore (SG); Michiel Sebastiaan Emanuel Petrus Knoppert, Amsterdam (NL); Weiyi Wang, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/789,037

(22) Filed: Jul. 30, 2024

(51) Int. Cl.
  *G06T 7/80* (2017.01)
  *G06F 1/16* (2006.01)
  (Continued)

(52) U.S. Cl.
  CPC .............. *G06T 7/85* (2017.01); *G06F 1/163* (2013.01); *G06F 3/012* (2013.01); *G06F 3/016* (2013.01);
  (Continued)

(58) Field of Classification Search
  CPC ......... G06T 7/85; H04N 13/156; H04N 23/64
  (Continued)

(56) References Cited

U.S. PATENT DOCUMENTS

| 4,907,296 A | 3/1990 | Blecha |
|---|---|---|
| 5,856,811 A | 1/1999 | Shih |

(Continued)

FOREIGN PATENT DOCUMENTS

| CA | 3223178 A1 | 12/2022 |
|---|---|---|
| WO | 202006819 A1 | 2/2020 |

(Continued)

OTHER PUBLICATIONS

Md Messal Monem Miah et al., "Multimodal Contextual Dialogue Breakdown Detection for Conversational Ai Models", NAACL 2024 Industry Track, arXiv:2404.08156v1, Apr. 11, 2024, <https://arxiv.org/abs/2404.08156v1>, retrieved on Jul. 24, 2024 (12 pages).

(Continued)

*Primary Examiner* — Dave Czekaj
(74) *Attorney, Agent, or Firm* — WOMBLE BOND DICKINSON (US) LLP

(57) ABSTRACT

Methods and systems for managing operation of a display free body wearable computing device are disclosed. The method may include obtaining a calibration stereo image when the display free body wearable computing device is identified to be used by a user. The method may also include screening the calibration stereo image for conditions that may impact an ability of the display free body wearable computing device to capture desirable stereo images. The conditions may include, for example, a degree of rotation of at least one image sensor of the display free body wearable computing device, a degree of vertical positioning alignment of the at least one image sensors, and presence of an obstacle in a field of view of the at least one image sensor. The method may also include actively guiding the user to reposition the at least one image sensor based on the identified condition.

20 Claims, 11 Drawing Sheets

(51) Int. Cl.
  *G06F 3/01* (2006.01)
  *G06F 3/16* (2006.01)
  *H04N 13/156* (2018.01)
  *H04N 23/60* (2023.01)
  *H04S 7/00* (2006.01)

(52) U.S. Cl.
  CPC ........... *G06F 3/167* (2013.01); *H04N 13/156* (2018.05); *H04N 23/64* (2023.01); *G06T 2207/30168* (2013.01); *G06T 2207/30244* (2013.01); *H04S 7/304* (2013.01); *H04S 2400/11* (2013.01)

(58) Field of Classification Search
  USPC .......................................................... 348/47
  See application file for complete search history.

(56) References Cited

U.S. PATENT DOCUMENTS

| | | | |
|---|---|---|---|
| 7,810,750 B2 * | 10/2010 | Abreu | G02C 5/143 |
| | | | 351/159.75 |
| 8,159,519 B2 | 4/2012 | Kurtz | |
| 8,902,315 B2 | 12/2014 | Fisher et al. | |
| 9,538,072 B2 | 1/2017 | Stewart et al. | |
| 10,110,805 B2 * | 10/2018 | Pomerantz | H04N 23/51 |
| 10,163,210 B2 | 12/2018 | Kim | |
| 10,389,993 B2 | 8/2019 | Macmillan et al. | |
| 10,924,651 B2 | 2/2021 | Chaudhri et al. | |
| 11,196,863 B2 | 12/2021 | Spohrer | |
| 11,206,325 B1 | 12/2021 | Dennis | |
| 11,431,038 B2 | 8/2022 | Jhawar et al. | |
| 11,431,660 B1 | 8/2022 | Leeds et al. | |
| 11,489,996 B2 | 11/2022 | Burton | |
| 11,523,055 B1 | 12/2022 | Chaudhri et al. | |
| 11,523,243 B2 | 12/2022 | Satongar et al. | |
| 11,567,569 B2 * | 1/2023 | Spencer | G06V 10/751 |
| 11,816,269 B1 | 11/2023 | Chaudhri et al. | |
| 11,899,911 B2 | 2/2024 | Kocienda et al. | |
| 12,026,842 B1 | 7/2024 | Mayoral | |
| 2009/0122161 A1 * | 5/2009 | Bolkhovitinov | G09B 21/006 |
| | | | 348/222.1 |
| 2011/0279666 A1 | 11/2011 | Strombom | |
| 2014/0146153 A1 | 5/2014 | Birnkrant | |
| 2015/0009550 A1 | 1/2015 | Misago | |
| 2016/0225192 A1 | 8/2016 | Jones | |
| 2017/0007351 A1 | 1/2017 | Yu | |
| 2017/0099479 A1 | 4/2017 | Browd | |
| 2017/0181802 A1 | 6/2017 | Sachs | |
| 2017/0322410 A1 | 11/2017 | Watson | |
| 2018/0012413 A1 | 1/2018 | Jones | |
| 2018/0325498 A1 | 11/2018 | Bongiorno et al. | |
| 2019/0253700 A1 * | 8/2019 | Tornéus | G06F 3/012 |
| 2019/0254754 A1 | 8/2019 | Johnson | |
| 2019/0370532 A1 * | 12/2019 | Soni | H04N 23/611 |
| 2020/0117025 A1 | 4/2020 | Sauer | |
| 2020/0330179 A1 | 10/2020 | Ton | |
| 2021/0067764 A1 | 3/2021 | Shau | |
| 2021/0117680 A1 | 4/2021 | Chaudhri et al. | |
| 2021/0169417 A1 * | 6/2021 | Burton | A61B 5/4857 |
| 2021/0173480 A1 | 6/2021 | Osterhout et al. | |
| 2023/0280821 A1 | 9/2023 | Kocienda et al. | |
| 2023/0280866 A1 | 9/2023 | Kocienda et al. | |
| 2023/0281254 A1 | 9/2023 | Kocienda et al. | |
| 2023/0281256 A1 | 9/2023 | Kocienda et al. | |
| 2023/0282214 A1 | 9/2023 | Kocienda et al. | |
| 2023/0283705 A1 | 9/2023 | Chaudhri et al. | |
| 2023/0283885 A1 | 9/2023 | Kocienda et al. | |
| 2023/0283886 A1 | 9/2023 | Kocienda et al. | |
| 2023/0327497 A1 | 10/2023 | Chaudhri et al. | |
| 2024/0126363 A1 | 4/2024 | Kocienda et al. | |
| 2024/0155194 A1 | 5/2024 | Kocienda et al. | |
| 2024/0242721 A1 | 7/2024 | Kocienda et al. | |

FOREIGN PATENT DOCUMENTS

| | | |
|---|---|---|
| WO | 2020068819 A1 | 4/2020 |
| WO | 2020/257329 A1 | 12/2020 |
| WO | 2023/168001 A1 | 9/2023 |
| WO | 2023/168071 A1 | 9/2023 |
| WO | 2023/168073 A1 | 9/2023 |
| WO | 2024/118974 A1 | 6/2024 |

OTHER PUBLICATIONS

Donggang Jia et al., "Voice: Visual Oracle For Interaction, Conversation, and Explanation", arXiv:2304.04083v2, Jan. 22, 2024, <https://arxiv.org/abs/2304.04083>, pp. 1-21, retrieved on Jul. 24, 2024 (21 pages).

Ambuj Mehrish et al., "A Review of Deep Learning Techniques for Speech Processing", arXiv:2305.00359v3, May 30, 2023, <https://arxiv.org/pdf/2305.00359>, pp. 1-111, retrieved on Jul. 24, 2024 (111 pages).

Giuseppe Attanasio et al., "Twists, Humps, and Pebbles: Multilingual Speech Recognition Models Exhibit Gender Performance Gaps", arXiv:2402.17954v2, Jun. 19, 2024, <https://arxiv.org/pdf/2402.17954>, retrieved on Jul. 24, 2024 (23 pages).

Konstantinos Tsiakas et al., "Unpacking Human-AI interactions: From interaction primitives to a design space", arXiv:2401.05115v1, Jan. 10, 2024, <https://arxiv.org/abs/2401.05115>, pp. 1-46, retrieved on Jul. 24, 2024 (46 pages).

Pabbathi Sri Charan et al., "Effective Gesture Based Framework for Capturing User Input", arXiv:2208.00913, Aug. 1, 2022, <https://arxiv.org/ftp/arxiv/papers/2208/2208.00913.pdf>, pp. 1-10, retrieved on Jul. 24, 2024 (10 pages).

Chao Chen et al., "Simple calibration method for dual-camera structured light system", Journal of the European Optical Society—Rapid Publications, 14, Article No. 23 (2018), Oct. 26, 2018, <https://doi.org/10.1186/s41476-018-0091-y>, pp. 1-11 pages retrieved on Jul. 24, 2024 (11 pages).

David Pierce, "Limitless is a new AI tool for your meetings—and an all-hearing wearable gadget", The Verge, Apr. 15, 2024, <https://www.theverge.com/2024/4/15/24130832/limitless-ai-pendant-wearable-meetings> retrieved on Jul. 30, 2024 (8 pages).

Schneider et al., "Gaze-aligned head-mounted camera with pan, tilt, and roll motion control for medical documentation and teaching applications", Oct. 2006, 2006 IEEE International Conference on Systems, Man, and Cybernetics, pp. 327-331 (5 pages).

Schneider et al., "Movies Made Through the Eyes of a Mobile User With a Gaze-Aligned Camera", ICME 2006, pp. 2121-2124 (4 pages).

* cited by examiner

MANAGING OPERATION OF A DISPLAY FREE BODY WEARABLE COMPUTING DEVICE

FIELD

Embodiments disclosed herein relate generally to managing operation of a display free body wearable computing device. More particularly, embodiments disclosed herein relate to managing operation of a display free body wearable computing device by guiding a user of the display free body wearable computing device to modify a manner in which the display free body wearable computing device is worn.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
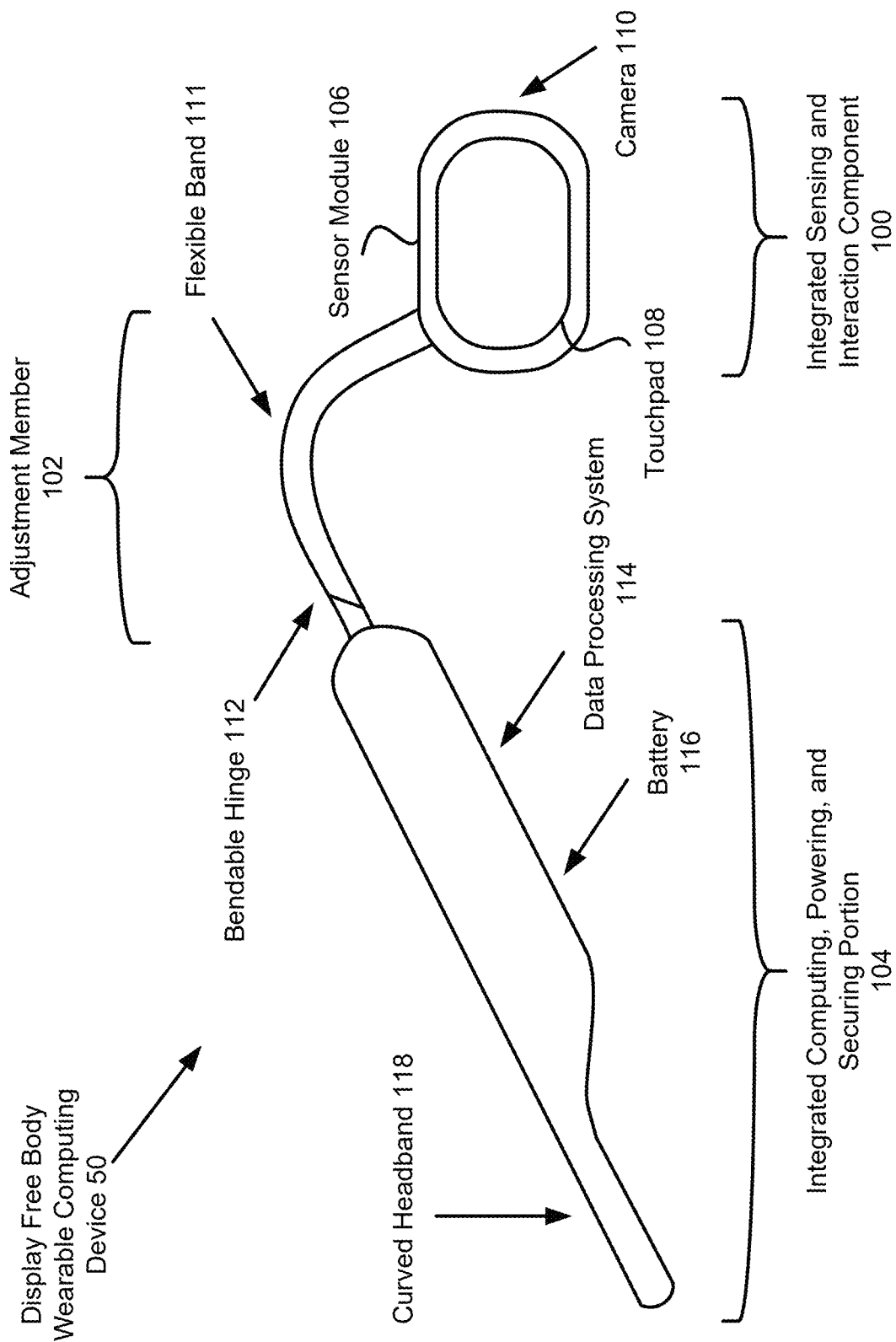
FIG. 1A shows a diagram illustrating a display free body wearable computing device in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of a display free body wearable computing device. The display free body wearable computing device may be configured to be worn on a user's head. When worn by the user, the display free body wearable computing device may provide computer-implemented services by interacting with the user. The computer-implemented services may include capturing images of a scene that the user is present.

To provide the computer-implemented services, the display free body wearable computing device may operate in a manner that enables the display free body wearable computing device to capture desirable stereo images. For example, a pair of cameras may be configured to be establish a camera field of view that includes a field of view of the user.

However, an ability for the pair of cameras to capture the desirable stereo images may be impaired by conditions impacting the display free body wearable computing device. For example, a manner in which a user is wearing the display free body wearable computing device may cause at least one camera of the pair of cameras to be misaligned and subsequent stereo images captured by the pair of cameras may negatively impact computer-implemented services provided by the display free body wearable computing device.

To improve a likelihood that desirable stereo images may be captured by the display free body wearable computing device, the display free body wearable computing device may obtain a calibration stereo image for screening against conditions impacting the display free body wearable computing device. The conditions may include a degree of rotation of at least one of the two image sensors with respect to the user, a degree of vertical positioning alignment of the at least one of the two images with respect to the user, a presence of an obstacle in a field of view of the at least one of the two image sensors, and/or any other conditions.

When the display free body wearable computing device is identified to be impacted by at least one of the conditions, the display free body wearable computing device may actively guide the user using sensory feedback to modify a manner in which the display free body wearable computing device is worn by the user (e.g., to reduce an impact of the at least one of the conditions). To actively guide the user, the display free body wearable computing device may provide the sensory feedback that may include audio cues, spatial audio, haptic feedback, and/or any other feedback adapted to direct user adjustment of the at least one image sensor.

Thus, embodiments disclosed herein may provide an improved method for managing operation of a display free body wearable computing device by guiding a user to modify a manner in which the display free body wearable computing device is worn to obtain desirable stereo images using the repositioned display free body wearable computing device. By doing so, the stereo images may be used to provide computer-implemented services that may have a higher level of quality.

In an embodiment, a method for managing operation of a display free body wearable computing device is provided. The method may include: (i) identifying that the display free body wearable computing device is being used by a user; (ii) based on the identifying: (a) obtaining, using at least two image sensors of the display free body wearable computing device, a calibration stereo image; (b) screening the calibration stereo image for conditions impacting the display free body wearable computing device that may impair an ability of the display free body wearable computing device to capture desirable stereo images; (c) in an instance of the screening where the display free body wearable computing device is impacted by at least one of the conditions: actively guiding the user using sensory feedback to modify a manner in which the display free body wearable computing device is worn by the user to obtain a repositioned display free body wearable computing device; (d) obtaining, using the repositioned display free body wearable computing device, at least one of the desirable stereo images; and (e) providing computer implemented services using the at least one of the desirable stereo images.

The conditions may include: (i) a degree of rotation of at least one of the at least two image sensors with respect to the user exceeding a threshold degree of rotation that impairs stitching of images captured by the at least two image sensors; (ii) a degree of vertical positioning alignment of the at least one of the at least two image sensors with respect to the user exceeding a vertical positioning alignment threshold that impairs stitching of the images captured by the at least two image sensors; and (iii) a presence of an obstacle in a field of view of the at least one of the at least two image sensors that precludes capturing of the desirable images.

Actively guiding the user may include: in an instance of the screening where the conditions comprise the degree of rotation of the at least one of the at least two image sensors with respect to the user exceeding the threshold degree of rotation that impairs stitching of the images captured by the at least two image sensors: generating sensory feedback based instructions for the user to rotate the at least one of the at least two image sensors in a manner that places the degree of rotation of the at least one of the at least two image sensors with respect to the user within the threshold degree of rotation.

Actively guiding the user may also include: in an instance of the screening where the conditions comprise the degree of vertical positioning alignment of the at least one of the at least two image sensors with respect to the user exceeding the vertical positioning alignment threshold that impairs stitching of the images captured by the at least two image sensors: generating sensory feedback based instructions for the user to rotate the at least one of the at least two image sensors in a manner that places the degree of vertical positioning alignment of the at least one of the at least two image sensors with respect to the user within the threshold degree of vertical positioning alignment.

Actively guiding the user may also include: in an instance of the screening where the conditions comprise the presence of the obstacle in the field of view of the at least one of the at least two image sensors that precludes the capturing of the desirable images: generating sensory feedback based instructions for the user to remove the obstacle from the field of view.

The sensory feedback may include spatial audio adapted to direct user adjustment of at least one of the at least two image sensors.

The sensory feedback may also include audio cues adapted to direct user adjustment of at least one of the at least two image sensors.

The sensory feedback may also include haptic feedback adapted to direct user adjustment of at least one of the at least two image sensors.

The method may further include: (i) obtaining, using one or more motion sensors of the display free body wearable computing device, sensor data; and (ii) performing an image stitching process based on at least the sensor data and least one of the desirable stereo images to obtain a desirable stitched image.

The display free body wearable computing device may include: (i) an integrated sensing and interaction component adapted to: (a) be positioned symmetrically on two portions of a user's head, (b) be positioned between ears and eyes of the user, and (c) capture a stereo image of at least a portion of a scene present in a field of view of the user; (ii) an integrated computing, powering, and securing portion; and (iii) an adjustment member adapted to position the integrated sensing and interaction component with respect to the integrated computing, powering, and securing portion.

The integrated sensing and interaction component may include: (i) a pair of cameras; (ii) speakers; (iii) a microphone array; and (iv) a touch pad.

The integrated sensing and interaction component may be adapted to: (i) obtain the stereo image from the pair of cameras; (ii) at least partially process the stereo image to obtain an image processing result; (iii) identify an action to be performed based, at least in part, on the image processing result and a derived result from a remote entity, the derived result being based, at least in part, on the stereo image and/or the image processing result; and (iv) use at least the speakers to perform the action.

The pair of cameras may comprise lenses configured to: (i) establish a camera line of sight that is parallel to a line of sight of the user; and (ii) establish a camera field of view that comprises the field of view of the user.

The stereo image may include a pair of images of the scene, each of the images being captured at different angles and/or positions with respect to the scene by the pair of cameras.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1A, various types of computing devices may provide computer implemented services. The various types of computing devices may include, for example, desktop computers, laptop computers, cell phones, and/or other types of computing devices.

Such computing devices may provide any number and types of computer-implemented services (e.g., to a user of the computing device and/or devices operably connected to the computing device). The computer-implemented services may include, for example, data acquisition services, communication services, and/or other types of services that may be relevant to user and/or other devices.

However, the ability to provide such services may be limited based on the information available to the computing devices. For example, desktop computer may be positioned under a desk, or in other locations. Consequently, the desktop computer may have a very limited capability to gather information regarding the environment in which it resides.

Accordingly, due to the limited information, the types and quality of computer implemented services may be limited. Returning to the desktop computer example, such desktop computers may lack native ability to capture images and/or audio of scenes that are relevant to a user of the desktop computer. Thus, the desktop computer may lack the ability to provide some types of services that are relevant to a user.

In general, embodiments disclosed herein relate to systems, methods, and devices for providing computer implemented services that are of relevance to users. To provide the computer implemented services, a display free body wearable computing device may be utilized. For example, display free body wearable computing device 50 may be adapted to be worn by a user. When worn by a user, display free body wearable computing device 50 may be able to gather information that is more relevant to users for use in providing computer-implemented services.

The computer-implemented services may include, for example, capturing images of a portion of a scene present in a field of view of the user. To do so, display free body wearable computing device 50 may capture stereo images using a pair of cameras (e.g., positioned on both sides of a user's head).

However, conditions may impact display free body wearable computing device 50 that may impair an ability of display free body wearable computing device 50 to capture desirable stereo images. For example, at least one camera of the pair of cameras may be positioned in a manner (e.g., rotated, tilted down, etc.) that may capture images that may impair stitching of the images to obtain desirable images.

The conditions may be identified by obtaining a calibration stereo image by at least two cameras of display free body wearable computing device 50 when display free body wearable computing device 50 is identified to be worn by a user. The calibration stereo image be screened for the conditions impacting display free body wearable computing device 50.

Display free body wearable computing device 50 may identify conditions that may include: (i) a degree of rotation of at least one of the at least two cameras with respect to the user exceeding a threshold degree of rotation, (ii) a degree of vertical positioning alignment of at least one of the at least two cameras with respect to the user exceeding a threshold degree of vertical positioning alignment, (iii) a presence of an obstacle in a field of view of the at least one of the at least two cameras, and/or any other conditions that may impair capturing and/or stitching of stereo images captured by the cameras.

When display free body wearable computing device 50 is identified to be impacted by at least one of the conditions, display free body wearable computing device 50 may actively guide the user to modify a manner in which display free body wearable computing device 50 is worn to obtain a repositioned display free body wearable computing device. Display free body wearable computing device 50 may actively guide the user using sensory feedback that may include, for example, audio cues, spatial audio, haptic feedback, and/or any other sensory feedback.

By capturing desirable stereo images based on the repositioned display free body wearable computing device, display free body wearable computing device 50 may use the desirable stereo images to provide computer-implemented services that may have a higher quality and/or relevance to the user.

To provide the computer-implemented services to the user of display free body wearable computing device 50, display free body wearable computing device 50 may include: (i) integrated sensing and interaction component 100, (ii) adjustment member 102, and (iii) integrated computing, powering, and securing portion 104. Each of these components is discussed below.

Integrated sensing and interaction component 100 may provide input/output services to the user. To do so, integrated sensing and interaction component 100 may host sensors module 106, touchpad 108, camera 110, and/or any other components. To host the components, integrated sensing and interaction component 100 may include a pair of enclosures (e.g., 3-dimensional bubble-shaped housings that may be at least partially transparent) adapted to be positioned symmetrically on both sides of the user's head, between ears and eyes of the user (e.g., proximate to temples of the user). When worn, integrated sensing and interaction component 100 may operate, for example, without covering the user's ear and extending past the user's eyes. By being positioned as such, the body wearable computing device may be worn and used to interact with the user without obstructing facial features (e.g., eyes, ears, etc.) of the user.

Integrated sensing and interaction component 100 may obtain inputs from any number of sensors to identify actions to be performed. For example, integrated sensing and interaction component 100 may identify that display free body wearable computing device 50 is being used by a user. When identified, integrated sensing and interaction component 100 (and/or any other components of display free body wearable computing device 50) may initiate a process to manage operation of display free body wearable computing device 50 (e.g., perform a calibration test). When operating, integrated sensing and interaction component 100 may obtain images relevant to the user. For example, the user may perform gestures and/or provide other input indicating a request to obtain images of a portion of a scene that the user is present.

For example, consider a scenario in which a user raises a hand to point at car while issuing a voice command to take a picture. Integrated sensing and interaction component 100 may identify the user's hand as a pointing gesture and/or identify the voice command issued by the user. Integrated sensing and interaction component 100 and/or any other entities (e.g., data processing system 114, remote entities, etc.) may subsequently identify an action set based on the gesture and/or the voice command. The action set may include, for example, audio instructions using speakers of integrated sensing and interaction component 100 to direct the user to remove the user's hand from a field of view while retaining the car in the field of view, activating image sensors of camera 110 to capture a stereo image, combining the stereo image, and/or any other actions.

Touchpad 108 may be used to receive tactile input. For example, a user may provide input by using one or more fingers to touch, press, any/or perform any other actions using touchpad 108. The input may be used, for example, to trigger actions, provide information to the display free body wearable computing device for use in providing computer-implemented services, and/or any other use cases. To improve ease of use, touchpad 108 may be affixed to a lateral side of integrated sensing and interaction component 100 away from the user's head when worn. Touchpad 108 may be included on either or both enclosures of integrated sensing and interaction component 100.

Sensor module 106 may provide at least a portion of the input/output services provided by integrated sensing and interaction component 100. To do so, sensors module 106 may include any number and/or type of sensors. For example, sensors module 106 may include speakers and a microphone array. The microphone array of sensor module may obtain, for example, a voice command from the user. Integrated sensing and interaction component 100 may process the voice command to trigger an action set to capture an image of the scene. Sensor module 106 may also provide audio output (e.g., via the speakers). The audio output may include, for example, spatial audio cues (e.g., sounds, beeps, etc.) to indicate a direct adjustment of at least a portion of integrated sensing and interaction component 100, instructions (e.g., verbal instructions) to direct adjustment of at least a portion of integrated sensing and interaction component 100, and/or any other information.

Sensor module 106 may also include any number and/or types of motion sensors (e.g., accelerometers, gyroscopes, etc.). The motion sensors may obtain sensor data that may be used to (i) identify a positioning and/or orientation of at least a portion of integrated sensing and interaction component 100, (ii) compute adjustments that may be made to stereo images to obtain desirable stitched images, (iii) identify degrees of rotation of at least a portion of integrated sensing and interaction component 100 that may improve a positioning of display free body wearable computing device 50, (iv) provide a directionality of spatial audio feedback, and/or perform any actions.

Camera 110 may capture images. The images captured by camera 110 may include stereo images of at least a portion of a scene present in a field of view of the user. The stereo images may include a pair of images of the scene, each of the images being captured at different angle and/or positions (e.g., different viewpoints) with respect to the scene by camera 110.

To do so, camera 110 may include a pair of cameras that may each be positioned inside an enclosure of the pair of enclosures of integrated sensing and interaction component 100 on both sides of the user's head between eyes and ears of the user. Furthermore, camera 110 may be pointed in a direction generally aligned with a direction that the user's eyes may be pointed. By being positioned as such, camera 110 may be configured to establish a camera line of sight that is parallel to a line of sight of the user, and a camera field of view that include the field of view of the user. Refer to FIGS. 1C-1D for additional details regarding the camera field of view and the camera line of sight relative to the user.

Camera 110 may obtain any number of calibration stereo images that may be used to screen for conditions that may impact display free body wearable computing device 50. The calibration images may enable integrated sensing and interaction component 100 to identify information that may improve subsequent images captured by camera 110.

Camera 110 may configure image capturing settings (e.g., focus, zoom, etc.) based on information obtained by integrated sensing and interaction component 100 and/or any other components of display free body wearable computing device 50 (e.g., data processing system 114).

Adjustment member 102 may at least partially secure display free body wearable computing device 50 to the user's head and be adapted to position integrated sensing and interaction component 100 with respect to integrated computing, powering, and securing portion 104. To do so, adjustment member may include flexible band 111 and bendable hinge 112.

Flexible band 111 may be configured in a shape (e.g., a curved shape) that may enable adjustment member 102 to rest on an ear of the user while display free body wearable computing device 50 is used by the user. Furthermore, flexible band 111 (e.g., the shape of flexible band 111) may be modified (e.g., via bending) to improve comfort and/or fit of display free body wearable computing device 50 while used by the user. When modified, flexible band 111 may enable reposition of at least a portion of display free body wearable computing device 50 relative to the user.

Bendable hinge 112 may enable repositioning of integrated sensing and interaction component 100 with respect to integrated computing, powering, and securing portion 104. For example, when bendable hinge 112 is in a first state (e.g., not bent), integrated computing, powering, and securing portion 104 may be configured to be positioned around the back of the user's head while integrated sensing and interaction component 100 is positioned between ears and eyes of the user. Alternatively, when bendable hinge 112 is in a second state (e.g., bent at a certain angle), integrated computing, powering, and securing portion 104 may be configured to be positioned around the top of the user's head while integrated sensing and interaction component 100 is positioned between ears and eyes of the user.

Integrated computing, power, and securing portion 104 may provide at least a portion of the computer-implemented services and may at least partially secure display free body wearable computing device 50 to the user. To do so, integrated computing, powering, and securing portion 104 may include an enclosure that includes: (i) data processing system 114, (ii) battery 116, and (iii) curved headband 118.

Data processing system 114 may provide computer-implemented services based on inputs (e.g., stereo images, audio inputs, etc.) obtained from integrated sensing and interaction component 100. To do so, data processing system 114 may host any quantity of hardware resources that may include, for example, a processor operably coupled to memory, storage, and/or other hardware components (e.g., sensors of integrated sensing and interaction component 100). Data processing system 114 may facilitate performance of actions requested by a user of display free body wearable computing device 50 (e.g., independently and/or cooperatively with remote entities that may provide a second portion of computer-implemented services).

Using the hosted hardware resources and/or applications supported by the hardware resources, data processing system 114 may provide services relevant to images, audio, text, decision making, and/or any other capabilities. For example, data processing system 114 may perform operations relevant to the service and/or data processing system 114 may communicate with remote entities using a network stack hosted by hardware resources of data processing system 114.

To provide services relevant to images (e.g., pictures, video, etc.), data processing system 114 may obtain image data from one or more cameras of camera 110. The image data may include, for example, calibration stereo images. Based on the calibration stereo images, data processing system 114 may perform any number and/or type of processes (e.g., computations, image stitching algorithms, object detection, etc.) that may be used to manage operation of display free body wearable computing device 50. By doing so, subsequent image data obtained may be of a higher quality for use in providing computer-implemented services to the user.

The computer-implemented services may include, for example, identifying user inputs (e.g., hand gestures) that may indicate requests for actions to be performed by the body wearable computing device. Data processing system 114 may subsequently make decisions to handle the requests based on the user input. Additionally, data processing system 114 may perform image stitching using a stereo image of the image data to obtain a unified image of a portion of a scene present in a field of view of the user. Data processing system 114 may process and/or perform actions based on derived information from the unified image.

For example, based on a user gesture indicating a request to scan an object in the scene (e.g., for generation of a three-dimensional model of the object) and a first image of the object obtained from integrated sensing and interaction component 100, data processing system 114 may obtain an image capture plan. To do so, data processing system 114 may (i) identify a number and/or quality of images required to generate a three-dimensional model having a desired level of quality, locations and fields of view for obtaining a set of images, (ii) obtain a motion plan for the user to perform, and/or perform any other actions. Data processing system 114 may subsequently transmit at least portions of the image capture plan to integrated sensing and interaction component 100 for communication to the user.

To handle the requests based on the user inputs for decision making, data processing system 114 may utilize hardware and/or software adapted to process the user inputs. For example, data processing system 114 may use a tactile input handling application to make decisions (e.g., perform an action set, communicate information, etc.) based on tactile input received from touchpad 108.

Additionally, data processing system 114 may perform services based on audio input received from a microphone array of sensor module 106 that may include, for example, transcription, speaker segmentation, and/or any other service. To do so, data processing system 114 may, for example, host applications adapted to interpret conversations, recognize speech, convert speech to text, and/or perform any other operations. Data processing system 114 may similarly make decisions based on information obtained from the audio input.

To communicate results of the services to the user of the body wearable computing device, data processing system 114 may send information to be output from speakers of sensor module 106. To do so, data processing system 114 may utilize hardware and/or software to transmit the information to the speakers. For example, an application may convert text results obtained from the audio and/or image services, as discussed above, to an audio output format that may be communicated to the user.

Consider a scenario in which a first image includes the user's hands and an object in the scene in which the user is present. Data processing system 114 and/or integrated sensing and interaction component 100 may recognize hand gestures performed by the user's hands that may indicate a request for display free body wearable computing device 50 to capture images and/or scan the object for use in generating a three-dimensional model of the object. Data processing system 114 may subsequently communicate the image and/or information from the image to any number and/or type of remote entities (e.g., cloud services, remote artificial intelligence platforms, etc.) that may provide additional services that may provide requested information/results to data processing system 114. Data processing system 114 may then provide instructions to integrated sensing and interaction component 100 to dictate (e.g., using speakers) the requested information. Once the images of the object have been captured, data processing system 114 may obtain the images, at least partially process the images, communicate the images to the remote entities, and/or perform any other actions.

Battery 116 may supply electrical power to data processing system 114, components of integrated sensing and interaction component 100, and/or any other entities. To do so, battery 116 may obtain and/or store electrical power provisioned by an external power source. The electrical power may subsequently be provided to components of display free body wearable computing device 50 that may request the electrical power for operation.

Curved headband 118 may connect two portions of the body wearable computing device. For example, curved headband may be configured in a curved shape and be adapted to connect a first side of display free body wearable computing device 50 (e.g., including a first portion of integrated sensing and interaction component 100, adjustment member 102, etc.) that may be positioned on the first side of the user's head to a second side of display free body wearable computing device 50 that may be positioned on the second side of the user's head.

While illustrated in FIG. 1A with a limited number of specific components, a system may include additional, fewer, and/or different components without departing from embodiments disclosed herein.

Thus, as shown in FIG. 1A, display free body wearable computing device 50 may provide computer-implemented services to a user using components adapted to obtain information regarding a scene desired by the user.

Figure 1B:
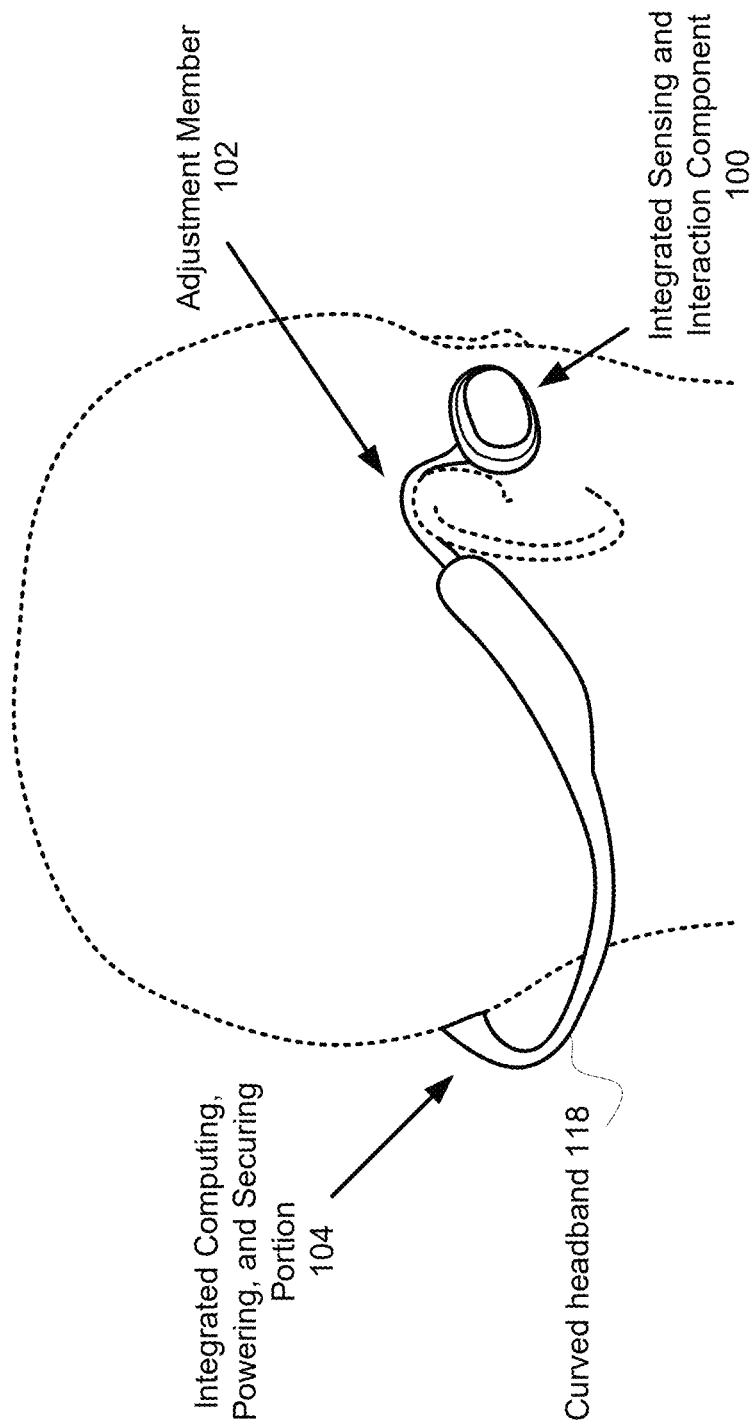
FIGS. 1B-1D show diagrams illustrating alternative views of the display free body wearable computing device in accordance with an embodiment.
Figure 1C:
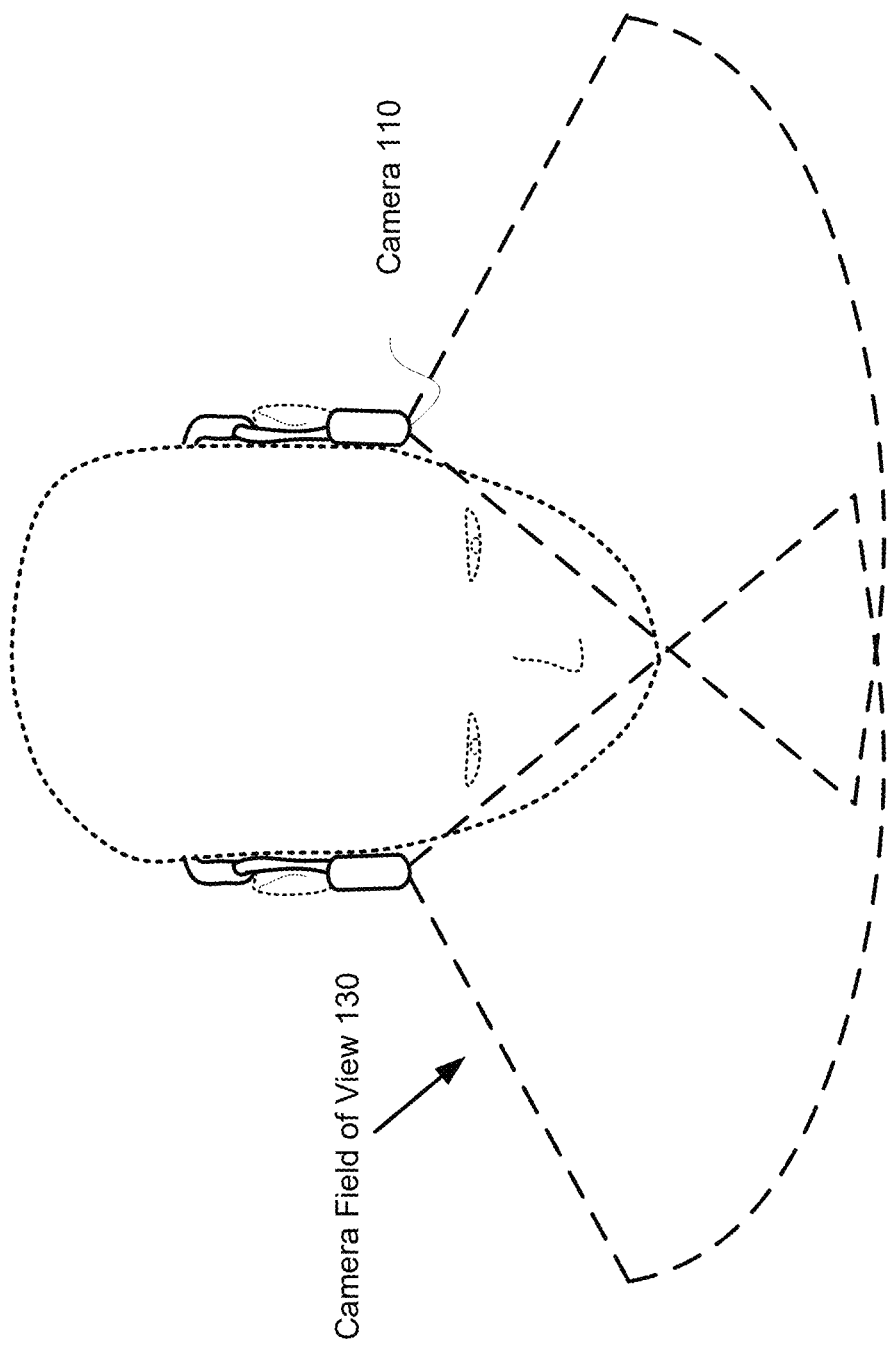
Figure 1D:
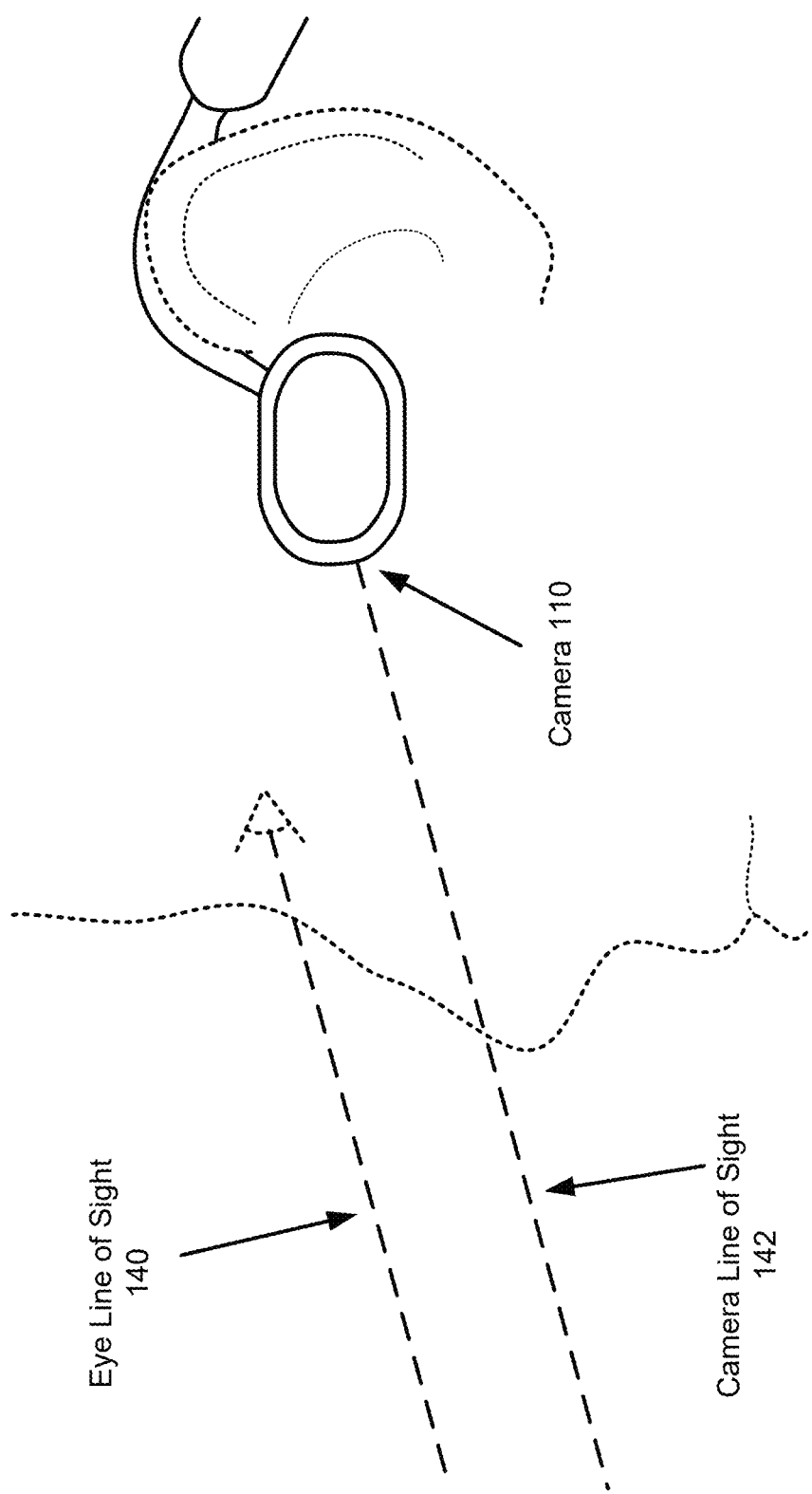

Turning to FIG. 1B, an alternate view of display free body wearable computing device 50 in accordance with an embodiment is shown.

In FIG. 1B, display free body wearable computing device 50 may be illustrated while worn by a user (drawn in short-dashed outline). As shown in FIG. 1B, a portion of integrated sensing and interaction component 100 of display free body wearable computing device 50 is positioned on a first side of the user's head between an eye and an ear of the user while a portion of adjustment member 102 rests on the ear of the user. While not shown, it may be appreciated that a second portion of integrated sensing and interaction component 100 and a second portion of adjustment member 102 may be similarly positioned on a second side of the user's head.

Integrated computing, powering, and securing portion 104 and curved headband 118 of integrated computing, powering, and securing portion 104 may connect the first portions and second portions of adjustment member 102 and integrated sensing and interaction component 100. To do so, curved headband 118 may wrap around the back of the user's head, as shown, while adjustment member 102 is in a first configuration (e.g., not bent). While not shown, it may be appreciated that curved headband 118 and integrated computing, powering, and securing portion 104 may be positioned around the top of the user's head and/or any other position when adjustment member 102 is in a second configuration.

Turning to FIG. 1C, a second alternate view of display free body wearable computing device 50 in accordance with an embodiment is shown. The second alternate view of display free body wearable computing device 50 may include a top-down view of display free body wearable computing device 50 while worn by a user (drawn in short-dashed outline) and may illustrate a camera field of view established by camera 110 (drawn in long-dashed outline).

Camera 110 of integrated sensing and interaction component 100 may, as discussed above, include a pair of cameras positioned on both sides of the user's head between eyes and ears of the user and may be pointed in a direction generally aligned with a direction that the user is facing. Each camera of the pair of cameras may include lens and a sensor that may be configured to establish a portion of camera field of view 130. Camera field of view 130 may include an angular measurement that may indicate a viewable area that may be captured by the camera.

Camera field of view 130 may be established based on the lens (e.g., a focal length of the lens) and/or the sensor (e.g., a size of the sensor) of camera 110. Each camera of the pair of cameras of camera 110 may establish a portion of camera field of view 130 that may each capture a portion of a scene at different angles and/or positions with respect to the scene by the pair of cameras.

For example, consider a scenario in which camera field of view 130 is configured by camera 110 to be 120 degrees of horizontal view. Each camera of the pair of cameras of display free body wearable computing device 50 may capture an image based on the 120 degrees of the scene present in a field of view of the user. When aggregated (e.g., used together), a field of view of the images exceed a field of field of the user. The field of view of the user may include, for example, 120 degrees of viewable area based on binocular vision (e.g., a single image perceived from a pair of images view by a pair of eyes) of the user. The pair of cameras of camera 110 may similarly capture a stereo image that may include a pair of images of the portion of the scene present in the field of view of the user at the different angles and/or positions.

The stereo image may be processed (e.g., via image stitching, aggregation, etc.) by integrated sensing and interaction component 100, data processing system 114, and/or any other entities to generate a resulting image that may include at least the portion of the scene present in the field of view of the user (e.g., a greater field of view when compared to the user's field of view based on the user's binocular vision). The resulting image may subsequently provide information (e.g., additional information that the user may not obtain based on a field of view of the user's eyes) relevant to providing computer-implemented services to the user.

However, the computer-implemented services may be negatively impacted when a degree of rotation of at least one of the pair of cameras of camera 110 exceeds a threshold degree of rotation that may impair stitching of images captured by camera 110. For example, if a first camera of the pair of cameras is rotated in a direction closer to the user's face than indicated by the threshold degree of rotation, camera field of view 130 may be reduced. To improve a likelihood that camera field of view 130 may capture a desired field of view, display free body wearable computing device 50 may identify when camera 110 is impacted by the degree of rotation (e.g., using calibration stereo images, motion sensor data, etc.) and guide the user to reposition the first camera. When repositioned, display free body wearable computing device 50 may capture desirable stereo images of at least a portion of the user's field of view.

Thus, as shown in FIG. 1C, camera 110 of display free body wearable computing device 50 may be adapted to capture images of at least a portion of the scene present in a user's field of view. The images may provide visual information usable to perform desired actions by display free body wearable computing device 50 for the user.

Turning to FIG. 1D, a third alternate view of display free body wearable computing device 50 in accordance with an embodiment is shown. The third alternate view of display free body wearable computing device 50 may include a side view of display free body wearable computing device 50 while worn by a user and may illustrate a camera line of sight established by camera 110.

Camera 110 may, as discussed above, include a pair of cameras positioned on both sides of the user's head between eyes and ears of the user and may be pointed in a direction generally aligned with a direction that the user is facing. Each camera of the pair of cameras may include lens and a sensor that may be configured to establish camera line of sight 142 that may be parallel to eye line of sight 140 of the user.

Camera line of sight 142 may enable camera 110 to capture images based on a vertical field of view that may be generally aligned with a vertical field of view of the user's eyes. The vertical field of view may be established, for example, by configuring cameras 110 (e.g., in a portrait orientation) to capture a vertical field of view that may include a vertical field of view of the user's eyes. By doing so, camera 110 may capture images of arm/hand movements and/or gestures when performed by the user.

However, the images captured by camera 110 may be negatively impacted when a degree of vertical position alignment of at least one of the pair of cameras of camera 110 exceeds a threshold degree of vertical position alignment that may impair stitching of images captured by camera 110. For example, if a first camera of the pair of cameras is rotated in a direction more downward than indicated by the vertical position alignment, camera field of view 142 may be vertically misaligned relative to eye line of sight 140. Subsequent stereo images captured may then impair stitching of the stereo images due to the vertical misalignment.

To improve a quality of stitched images using stereo images captured by camera 110, display free body wearable computing device 50 may identify when camera 110 is impacted by the degree of vertical positioning alignment (e.g., using calibration stereo images, motion sensor data, etc.) and guide the user to reposition the first camera. When repositioned, display free body wearable computing device 50 may capture desirable stereo images that may include a portion of a vertical field of view of the user.

Thus, as shown in FIG. 1D, cameras of display free body wearable computing device 50 may be adapted to capture images that may enable a user to interact with display free body wearable computing device 50 based on the user's line of sight.

Figure 2:
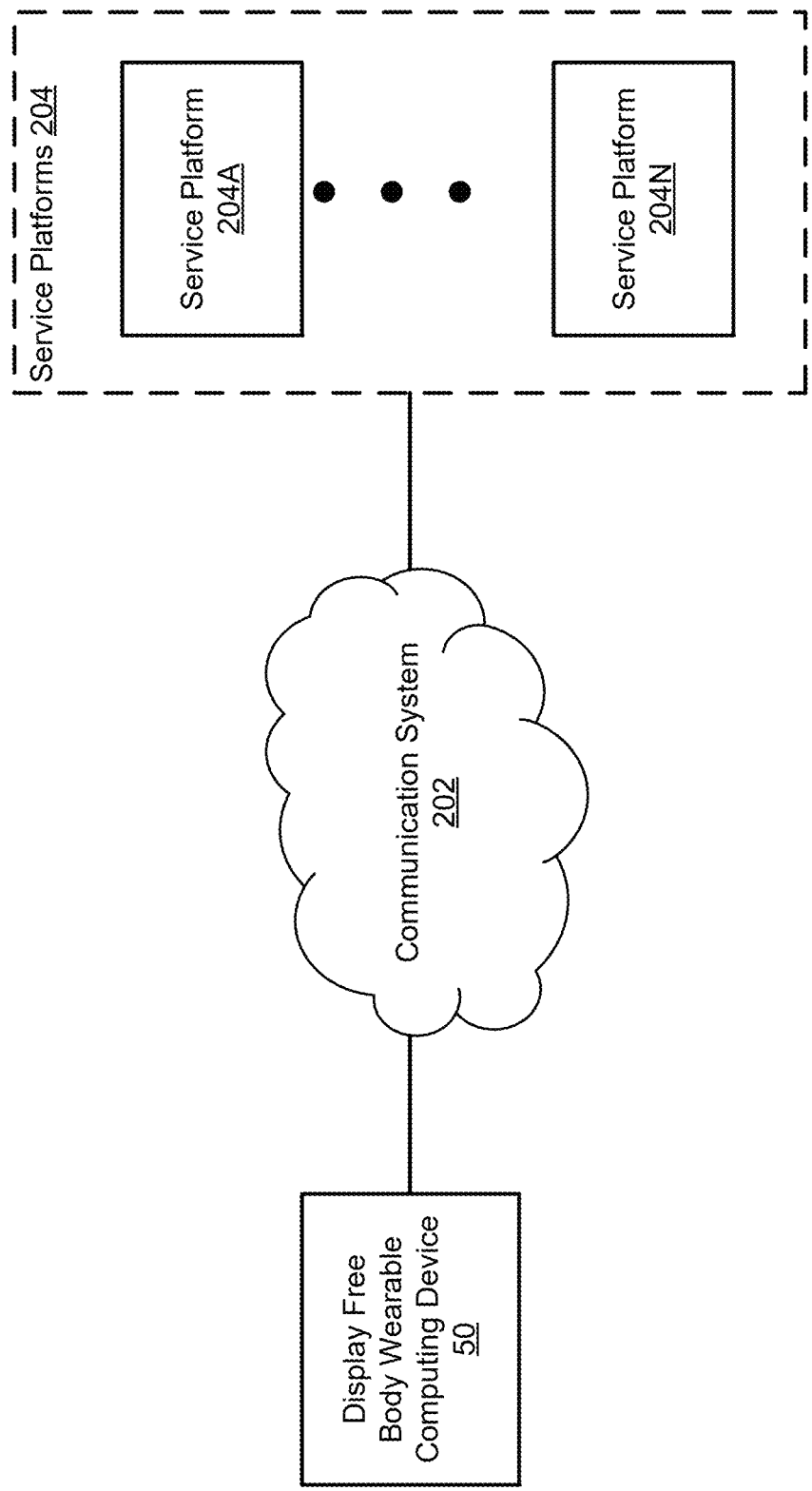
FIG. 2 shows a diagram illustrating a system in accordance with an embodiment.

Turning to FIG. 2, a block diagram in accordance with an embodiment is shown. The block diagram may illustrate a system used in providing computing-implemented services by the display free body wearable computing device.

Display free body wearable computing device 50 may, as previously discussed, provide computer-implemented services to a user. While providing the computer-implemented services, display free body wearable computing device 50 may interact with service platforms 204 to obtain information relevant to the computer-implemented services provided to the user.

Service platforms 204 may, as discussed above, provide remote computing services. Service platforms 204 may include any number and/or type of service platforms that may individually and/or cooperatively perform services requested by display free body wearable computing device 50. Service platforms 204 may include, for example, cloud services (e.g., image storage, speech-to-text, large language model, etc.), artificial intelligence platforms (e.g., generative artificial intelligence), and/or any other remote service platforms. Service platforms 204 may provide information based at least in part on input obtained from display free body wearable computing device 50.

Consider a scenario in which a user of display free body wearable computing device 50 desires to generate a three-dimensional (3D) interactive model of a room that the user is present. Once a request for the 3D interactive model is identified, display free body wearable computing device 50 may: (i) provide instruction to the user (e.g., to move around the room), (ii) capture images using the camera at a certain frequency (e.g., while the user is moving around the room), and/or perform any other actions. Display free body wearable computing device 50 may provide the captured images along with metadata regarding each of the captured images to a second service platform (e.g., 204B) of service platforms 204. Using image data provided by display free body wearable computing device 50, service platform 204B may perform, for example, 3D rendering service, video editing service, video storage services, and/or any other services to generate the 3D interactive model desired by the user. Display free body wearable computing device 50 may subsequently communicate a status (e.g., completion, instructions for access, etc.) of the desired 3D interactive model to the user.

Consider a second scenario in which a user, while wearing display free body wearable computing device 50, may be looking at a bird perched on a tree in a forest. Display free body wearable computing device 50 may obtain a request (e.g., via a voice command captured by a microphone array of display free body wearable computing device 50, a gesture captured by cameras of from display free body wearable computing device 50, etc.) from the user indicating a desire for a picture of the bird. Display free body wearable computing device 50 may: (i) obtain data that may include an image of the scene, (ii) pre-process the data (e.g., focus the image on the bird, stitch images from a plurality of images captured by cameras of display free body wearable computing device 50, etc.) to obtain a unified image, (iii) communicate the unified image to a service platform (e.g., 204A) of service platforms 204, and/or perform any other actions. Service platform 204A may perform, for example, object recognition services, information search services, and/or any other services to capture the desired image based on the unified image provided by display free body wearable computing device 50. Service platform 204A and/or a second service platform (e.g., service platform 204B) may store the desired image in an image storage service for subsequent retrieval by a user of display free body wearable computing device 50.

Communication system 202 may allow any of display free body wearable computing device 50 and service platforms 204 to communicate with one another (and/or with other devices not illustrated in FIG. 2). To provide its functionality, communication system 202 may be implemented with one or more wired and/or wireless networks. Any of these networks may be a private network (e.g., the "Network" shown in FIG. 5), a public network, a virtual network (e.g., a virtual private network), and/or may include the Internet. For example, display free body wearable computing device 50 may be operably connected to service platforms 204 via the Internet, a private network, etc. Display free body wearable computing device 50 and service platforms 204 may be adapted to perform one or more protocols for communicating via communication system 202.

Figure 3A:
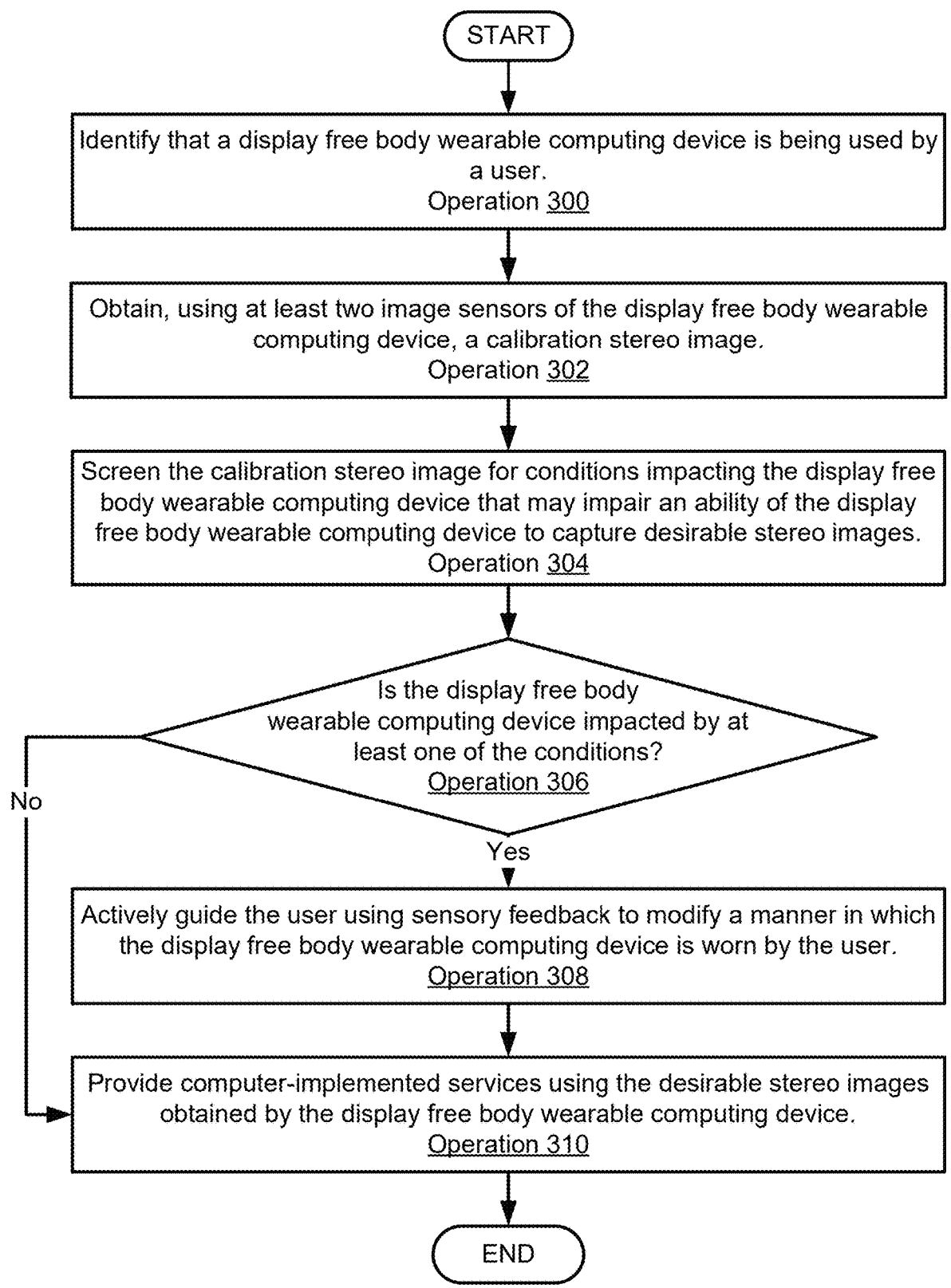
FIGS. 3A-3B show flow diagrams illustrating methods in accordance with an embodiment.
Figure 3B:
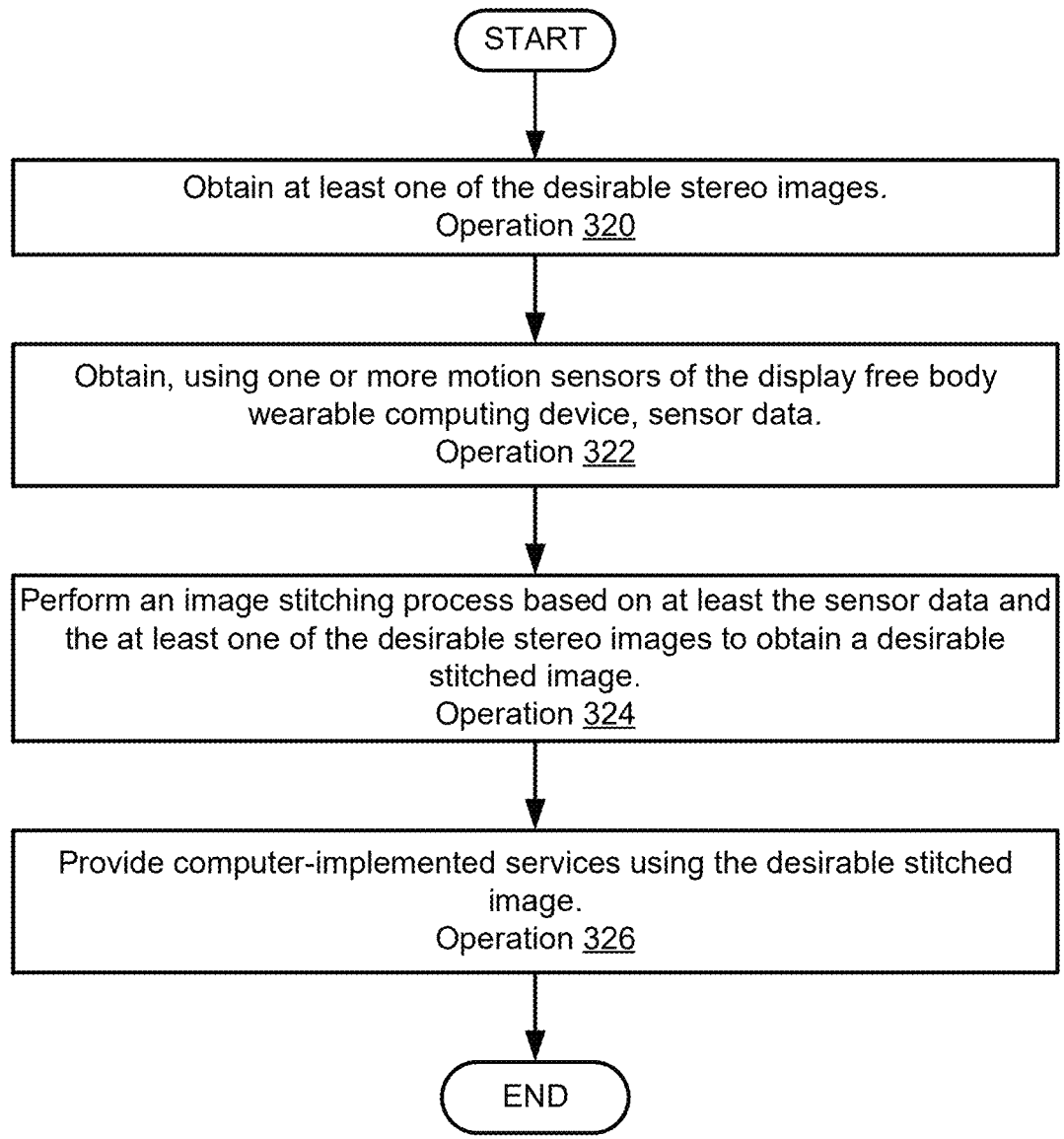

As discussed above, the components of FIG. 1A may perform various methods to manage operation of display free body wearable computing device 50. FIGS. 3A-3B illustrate methods that may be performed by the components of the system of FIG. 1A. In the diagrams discussed below and shown in FIGS. 3A-3B, any of the operations may be repeated, performed in different orders, and/or performed in parallel with or in a partially overlapping in time manner with other operations.

Turning to FIG. 3A, a first flow diagram illustrating a method of managing operation of a display free body wearable computing device to obtain desirable stereo images in accordance with an embodiment is shown. The method may be performed, for example, by any of the components of the system of FIG. 1A, and/or other components not shown therein.

At operation 300, display free body wearable computing device 50 may be identified as being used by a user. Display free body wearable computing device 50 may be identified as being used by a user by: (i) obtaining computer instructions indicating that the user may have performed an initiation process for display free body wearable computing device 50 (e.g., a booting process, a calibration process, etc.), (ii) monitoring for a change in a state (e.g., hibernation, suspension, etc.) to an active state of display free body wearable computing device 50, (iii) detecting that display free body wearable computing device 50 may have put on by the user (e.g., via motion sensors of display free body wearable computing device 50), (iv) requesting information regarding use of display free body wearable computing device 50 from the user, and/or any other processes.

At operation 302, a calibration stereo image may be obtained using at least two image sensors of display free body wearable computing device 50. The calibration stereo image may be obtained by: (i) activating the at least two image sensors, (ii) providing instructions to each of the at least two image sensors to capture the stereo image, (iii) providing feedback to the user to indicate that the images are being captured (e.g., shutter sounds, vibrations, etc.), and/or performing any other actions.

At operation 304, the calibration stereo image may be screened for conditions impacting display free body wearable computing device 50 that may impair an ability of display free body wearable computing device 50 to capture desirable stereo images. The calibration stereo image may be screened by: (i) combining (e.g., via an image stitching process) the calibration stereo image to obtain a stitched calibration image, (ii) identifying a quality (e.g., orientation, focus, overlap, etc.) of the stitched calibration image, (iii) obtaining sensor data related to attributes of the calibration stereo image, (iv) comparing the identified quality to criteria related to the conditions, (v) performing image analysis (e.g., blob detection, object segmentation, etc.) on the calibration stereo image, (vi) identifying a quality (e.g., size, position, etc.) of a region of interest present in the stitched calibration image, (vii) identifying a source (e.g., a left camera and/or a right camera) of an image of the calibration stereo image that meets a condition of the conditions, and/or performing any other actions.

The conditions may include: (i) a degree of rotation of at least one of the at least two image sensors with respect to the user exceeding a threshold degree of rotation, (ii) a degree of vertical positioning alignment of the at least one of the at least two image sensors with respect to the user exceeding a vertical positioning alignment threshold, and (iii) a presence of an obstacle in a field of view of at least one of the at least two image sensors.

At operation 306, a determination may be made regarding whether the display free body wearable computing device is impacted by at least one of the conditions. The determination may be made by: (i) obtaining a result of the screening of the calibration stereo image, (ii) comparing a quality of the calibration stereo image and/or information provided by sensors related to the calibration stereo image (e.g., inertial measurement data) to criteria (e.g., thresholds) related to each of the conditions, and/or any other processes. If the display free body wearable computing device is determined to be impacted by at least one of the conditions (e.g., the determination is "Yes" at operation 306), then the method may proceed to operation 308. If the display free body wearable computing device is not determined to be impacted by at least one of the conditions (e.g., the determination is "No" at operation 306), then the method may proceed to operation 310.

Figure 4A:
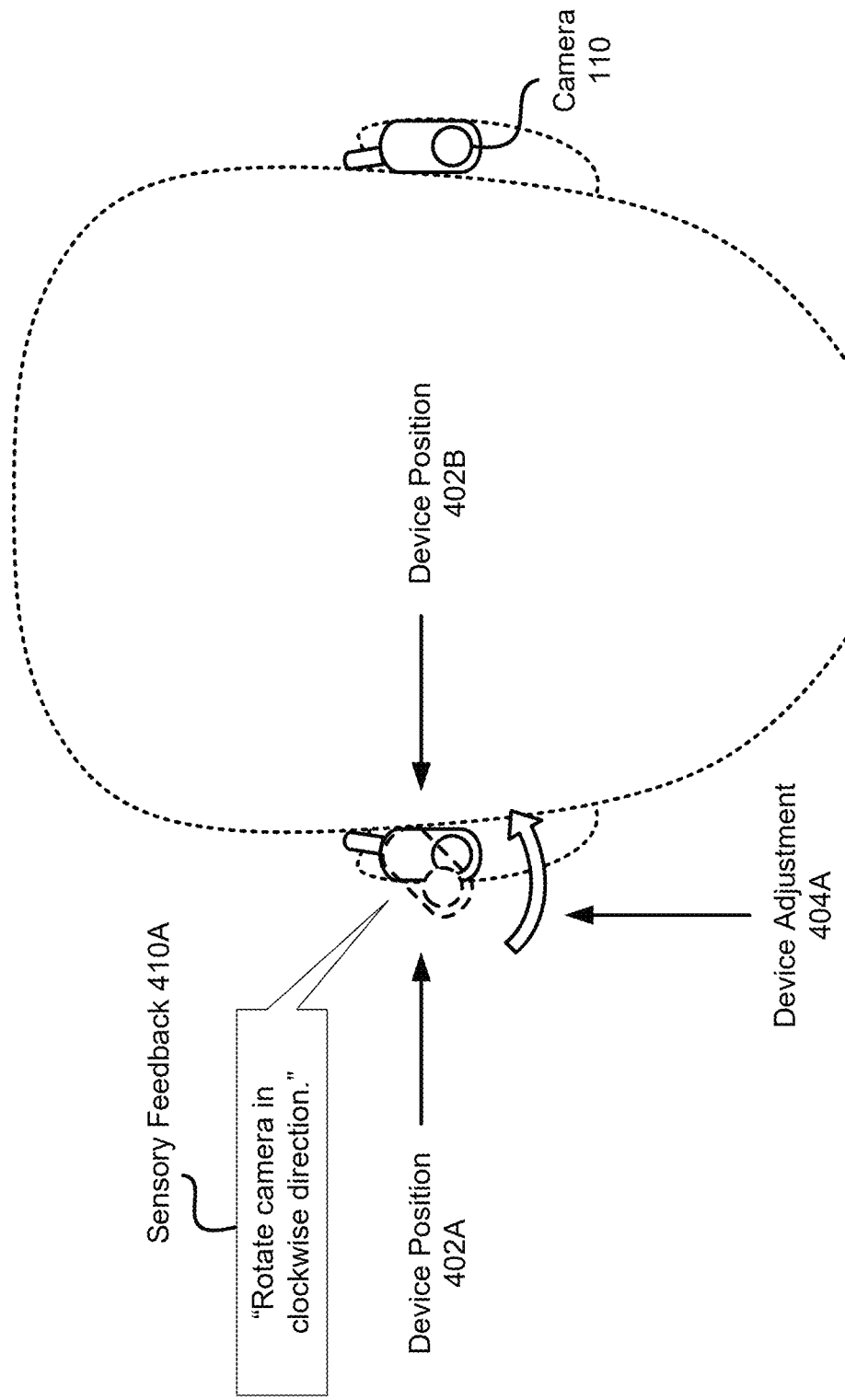
FIGS. 4A-4C show example diagrams illustrating activity that may occur during performance of methods in accordance with an embodiment.
Figure 4B:
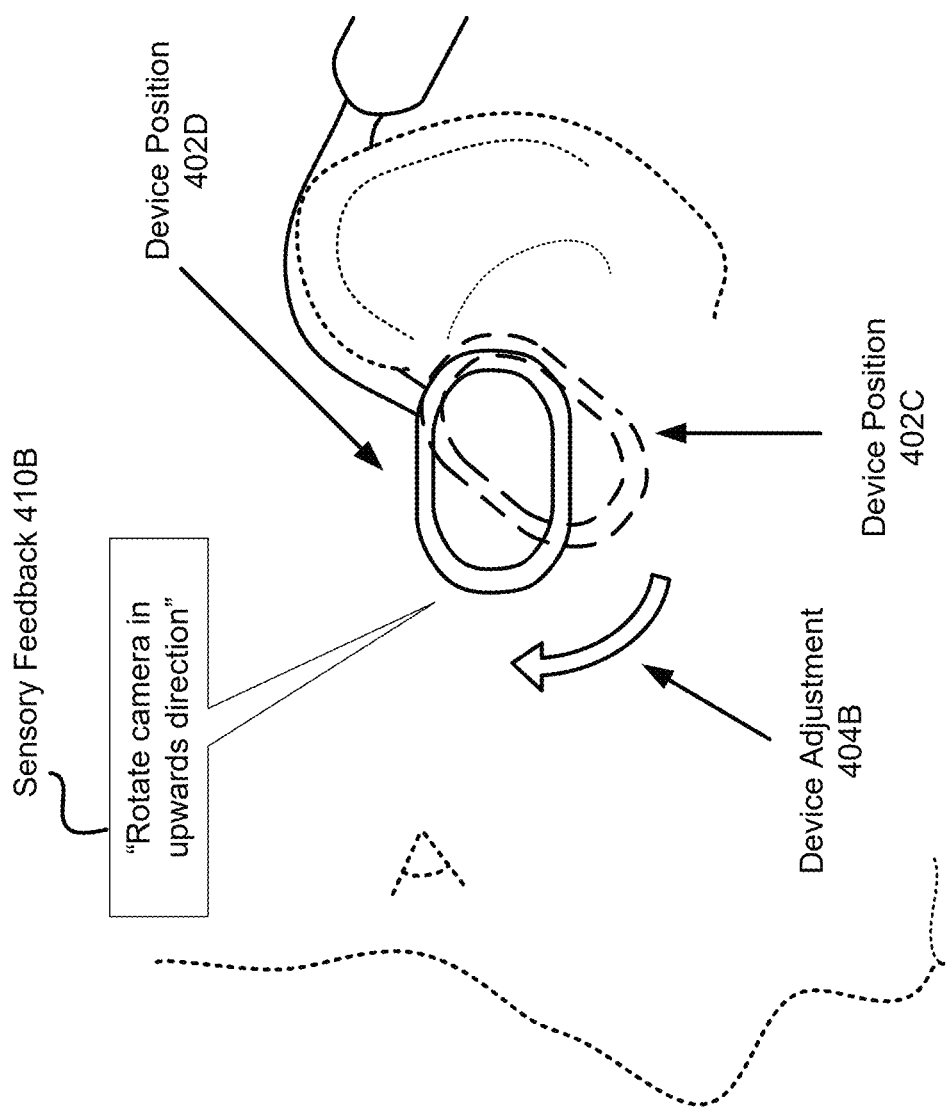
Figure 4C:
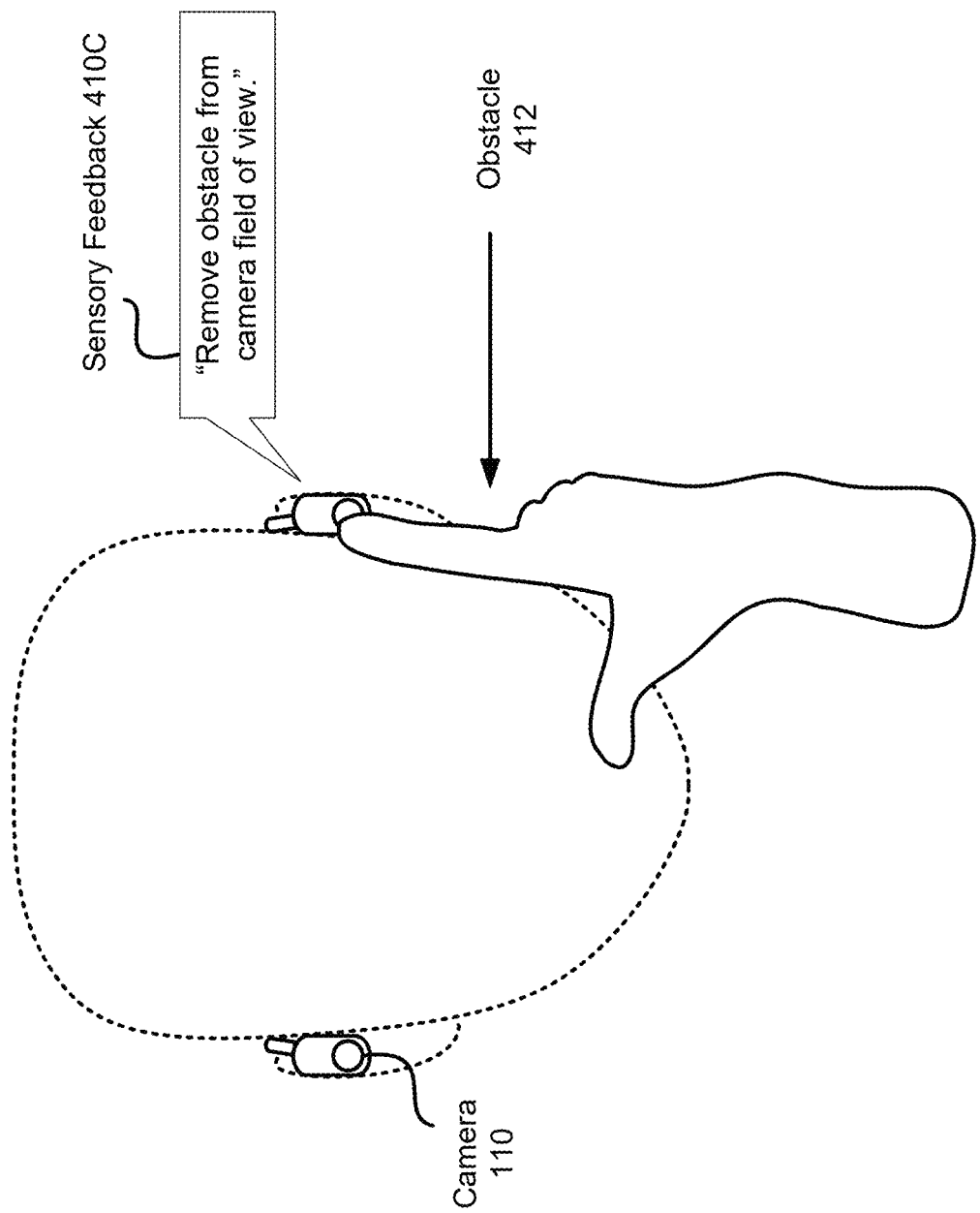

At operation 308, the user may be actively guided using sensory feedback by display free body wearable computing device 50 to modify a manner in which display free body wearable computing device 50 is worn to obtain a repositioned display free body wearable computing device. The user may be actively guided by: (i) providing audio cues for the user to rotate at least one of the image sensors (e.g., in a certain rotational and/or vertical direction), (ii) providing spatial audio (e.g., using speakers of display free body wearable computing device 50 to transmit a sound having a certain volume, direction, frequency, etc.) adapted to direct user adjustment of the at least one of the image sensors, (iii) providing haptic feedback (e.g., using a vibration motor and/or an actuator of display free body wearable computing device 50) adapted to direct the user adjustment of the at least one of the image sensors, and/or any other processes. Refer to FIGS. 4A-4C for additional details.

At operation 310, computer-implemented services may be provided using the desirable stereo images obtained by display free body wearable computing device 50. The computer-implemented services may be provided by: (i) obtaining at least one of the desirable stereo images (e.g., using image sensors of the repositioned display free body wearable computing device), (ii) obtaining sensor data (e.g., using motion sensors of display free body wearable computing device 50), (iii) performing an image stitching process based on at least the sensor data and the at least one of the desirable stereo images to obtain a desirable stitched image, (iv) obtaining information regarding a portion of a scene present in a field of view of cameras of the display free body wearable computing device 50, and/or any other processes. Refer to FIG. 3B for additional details.

The method may end following operation 310.

Using the method shown in FIG. 3A, operation of display free body wearable computing device 50 may be managed by identifying conditions that may impact an ability of display free body wearable computing device 50 to capture desirable images and, when identified, actively guiding a user of display free body wearable computing device 50 to modify a manner in which display free body wearable computing device 50 is worn to improve a likelihood that display free body wearable computing device 50 may capture the desirable images. By doing so, a quality of computer-implemented services provided by display free body wearable computing device 50 using the desirable images may be improved.

Turning to FIG. 3B, a second flow diagram illustrating a method of providing computer-implemented services using desirable stereo images obtained by display free body wearable computing device 50 is shown. The method may be performed, for example, by any of the components of the system of FIG. 1A, and/or other components not shown therein.

At operation 320, at least one of the desirable stereo images may be obtained. The at least one of the desirable stereo images may be obtained by, (i) configuring settings (e.g., focus, zoom, exposure, etc.) of each of the at least two image sensors (ii) activating the at least two image sensors, (iii) providing instructions to each of the at least two image sensors to capture the desirable stereo image, (iii) providing feedback to the user to indicate that the images are being captured (e.g., shutter sounds, vibrations, etc.), and/or performing any other actions.

At operation 322, sensor data may be obtained using one or more motion sensors of display free body wearable computing device 50. The sensor data may be obtained by: (i) collecting data and/or information related to a physical state (e.g., six degrees of freedom) of display free body wearable computing device 50, (ii) computing second information (e.g., orientation angles, rotation matrices, etc.) based on the first information, and/or performing any other actions.

At operation 324, an image stitching process may be performed based on at least the sensor data and the at least one of the desirable stereo images to obtain a desirable stitched image. The image stitching process may be performed by: (i) processing the desirable stereo image, (ii) modifying the desirable stereo image based on any number and/or types of information (e.g., the second information obtained at operation 322), (iii) identifying features (e.g., regions of interest, reference points, etc.), (iv) combining the desirable stereo image using a stitching algorithm (e.g., pixel to pixel comparisons), and/or any other processes.

At operation 326, computer-implemented services may be provided using the desirable stitched image. The computer-implemented services may be provided by: (i) capturing images of at least a portion of a scene that the user is present, (ii) obtaining information regarding the at least the portion of the scene (e.g., user hand gestures, objects of interest in the scene, etc.), (iii) processing the images captured (e.g., using data processing system 114 and/or remote entities), (iv) providing enhanced insight using the images captured, and/or any other processes.

The method may end following operation 326.

Using the method shown in FIG. 3B, desirable images may be obtained by display free body wearable computing device 50 based on the desired stereo images (e.g., obtained using a method described in FIG. 3A to reposition display free body wearable computing device 50). When obtained, the desirable images may enable display free body wearable computing device 50 to provide computer-implemented services that may have a higher quality when compared to computer-implemented services provided without the desirable images.

Thus, using the method illustrated in FIGS. 3A-3B, a data processing system in accordance with an embodiment may be more likely to be able to obtain more relevant information to provide computer implemented services.

To further clarify details of the disclosed embodiments, FIGS. 4A-4C show example figures depicting activity that may occur while the methods shown in FIGS. 3A-3B are performed.

Turning to FIG. 4A, a first example diagram showing activity that may occur while a user is actively guided to adjust a degree of rotation of display free body wearable computing device 50 in accordance with an embodiment is shown.

In FIG. 4A, integrated sensing and interaction component 100 of display free body wearable computing device 50 may be positioned in a first position (e.g., device position 402A, shown in long-dashed lines) when worn by a user. When identified as being worn by the user, display free body wearable computing device 50 may obtain (e.g., using a pair of cameras of camera 110 positioned on both sides of the user's head) a calibration stereo image.

The calibration stereo image may subsequently be screened by display free body wearable computing device 50 for conditions that may impair an ability of camera 110 to capture desirable stereo images. To do so, display free body wearable computing device 50 may process the calibration stereo image to identify a quality of the calibration stereo image (e.g., overlap of a features, regions of interest, etc.) and/or obtain additional information regarding an orientation of camera 110. The additional information may include, for example, sensor data obtained from motion sensors (e.g., accelerometer, gyroscope, etc.) of display free body wearable computing device 50.

Based on the calibration stereo image and/or the additional image, display free body wearable computing device 50 may identify that, while in device position 402A, a degree of rotation of at least one camera of camera 110 (e.g., a right camera positioned on the right side of the user's head from the user's perspective) may exceed a threshold degree of rotation that may impair stitching of images captured by cameras of camera 110.

For example, in device position 402A, display free body wearable computing device 50 may be rotated 15 degrees in a counterclockwise direction relative to an ideal degree of rotation (e.g., 0 degrees). Display free body wearable computing device 50 may identify that the right camera of camera 110 has a degree of rotation of 15 degrees using the calibration stereo image and/or the sensor data. Display free body wearable computing device 50 may also identify a threshold degree of rotation based on a set of rules and/or settings. While within the threshold degree of rotation (e.g., 5 degrees), camera 110 may enable display free body wearable computing device 50 to capture desirable stereo images that may be stitched to obtain a desirable stitched image for providing computer-implemented services (e.g., image capture, scene recognition, scanning, etc.) desired by the user.

To reposition display free body wearable computing device 50 so that the right camera of camera 110 may be placed within the threshold degree of rotation, display free body wearable computing device 50 may actively guide the user. To actively guide the user, display free body wearable computing device 50 may, for example, use any number and/or type of speakers (e.g., both speakers or only a right speaker located on a right portion of integrated sensing and interaction component 100) to provide sensory feedback 410A (e.g., a verbal audio cue to rotate the right camera in a clockwise direction).

Display free body wearable computing device 50 may also provide additional sensory feedback (not shown) that may include, for example, spatial audio that includes a sound projection that moves in a horizontal direction based the identified degree of rotation of device position 402A. The additional sensory feedback may also include haptic feedback and may be adapted to direct user adjustment of the right camera of camera 110.

Based on sensory feedback 410A, the user may reposition the right camera of camera 110 by performing device adjustment 404A. While performing device adjustment 404A, the additional sensory feedback (e.g., spatial audio, haptic feedback, etc.) may, for example, be provided to the user continuously and adjust (e.g., in direction, tone, volume, frequency, etc.) based on portions of device adjustment 404A. For example, as device adjustment 404A is performed, the spatial audio may change directions from a direction away from the user's head to a direction towards the user's head to indicate an adjustment of display free body wearable computing device 50 from device position 402A to device position 402B.

Device position 402B (shown in a solid line) may include a position identified as being within the threshold degree of rotation and may be the result of device adjustment 404A. While in device position 402B, display free body wearable computing device 50 may capture a second calibration stereo image that may indicate that a repositioned display free body wearable computing device may not be impacted by the condition that impairs camera 110 to obtain desirable stereo images.

Thus, using the repositioned display free body wearable computing device, display free body wearable computing device 50 may obtain the desirable stereo images for use in providing computer-implemented services that may be more relevant to the user.

Turning to FIG. 4B, a second example diagram showing activity that may occur while a user is actively guided to adjust a degree of vertical positioning alignment of display free body wearable computing device 50 in accordance with an embodiment is shown.

In FIG. 4B, integrated sensing and interaction component 100 of display free body wearable computing device 50 may be positioned in a first position (e.g., device position 402C, shown in long-dashed lines) when worn by a user. When identified as being worn by the user, display free body wearable computing device 50 may obtain (e.g., using a pair of cameras of camera 110 positioned on both sides of the user's head) a calibration stereo image.

The calibration stereo image may subsequently be screened by display free body wearable computing device 50 for the conditions that may impair an ability of camera 110 to capture desirable stereo images (e.g., similarly and/or concurrently to a process described in FIG. 4A).

To do so, display free body wearable computing device 50 may process the calibration stereo image to identify a region of interest overlap region between a pair of images of the calibration stereo image. A position of the region of interest overlap region may indicate that at least one camera of camera 110 may be vertically misaligned. For example, the region of interest overlap region being positioned at the top of a first image of the pair of the pair of images of the calibration stereo image that may be captured by a left camera of the pair of cameras of camera 110 may indicate that the left camera is positioned at a downward angle that may impair stitching of stereo images.

When identified, display free body wearable computing device 50 may actively guide the user to adjust the left camera of camera 110. To actively guide the user, display free body wearable computing device 50 may, for example, use any number and/or type of speakers (e.g., both speakers or only a left speaker located on a left portion of integrated sensing and interaction component 100) to provide sensory feedback 410B (e.g., a verbal audio cue to rotate the left camera in an upward direction).

To reposition the left camera of camera 110, the user may perform device adjustment 404B. As the user is performing device adjustment 404B, second sensory feedback (e.g., spatial audio) and/or third sensory feedback (e.g., haptic feedback) may be provided by at least a portion of integrated sensing and interaction component 100. For example, as device adjustment 404B positions the left camera of camera 110 closer to device position 402D (shown in a solid line) than device position 402C, an intensity of the haptic feedback may reduce and/or a direction of the spatial audio may shift upwards.

At device position 402D, the left camera of camera 110 may be within a threshold degree of vertical positioning alignment. To identify that the left camera is within the threshold degree of vertical positioning alignment, the pair of cameras of camera 110 may capture any number of additional calibration stereo images (e.g., as device adjustment 404B is performed) and screen the additional stereo images (e.g., until a degree of vertical positioning alignment is determined to be within the threshold degree of vertical positioning alignment). The threshold degree of vertical positioning alignment may include, for example, a percentage of the region of interest overlap region present in a top portion of an image of the pair of images of the calibration stereo image.

The repositioned display free body wearable computing device may not be impacted by the condition that impairs camera 110 to obtain desirable stereo images. Thus, using the repositioned display free body wearable computing device, display free body wearable computing device 50 may obtain the desirable stereo images for use in providing computer-implemented services that may be more relevant to the user.

Turning to FIG. 4C, a third example diagram showing activity that may occur while a user is actively guided to remove an obstacle from a field of view of at least one camera of a pair of cameras of display free body wearable computing device 50 is shown.

While wearing display free body wearable computing device 50, any number and/or type of obstacles may be present in a field of view of at least one camera of a pair of cameras of camera 110. An obstacle of the obstacles may preclude capturing of desirable images by obstructing a portion of a field of view of camera 110. For example, obstacle 412 may include a portion (e.g., a finger) of a user's hand. Obstacles may also include, for example, hair of the user, a smudge on a camera of camera 110, and/or any other obstacles.

To identify presence of an obstacle, display free body wearable computing device 50 may obtain (e.g., using a pair of cameras of camera 110 positioned on both sides of the user's head) a calibration stereo image. The calibration stereo image may be obtained following device adjustments to obtain a repositioned display free body wearable computing device (e.g., as described in FIGS. 4A-4B). The calibration stereo image may subsequently be screened by display free body wearable computing device 50 for presence of obstacles.

To screen the calibration stereo image, any number and/or types of processes (e.g., algorithms) may be performed using the calibration stereo image. For example, hair detection, blob detection, computer vision services, static object detection, and/or any other processes may be performed on the calibration stereo image. Additionally, integrated sensing and interaction component 100 of display free body wearable computing device 50 may include sensors (e.g., time of flight sensors) that may, for example, obtain sensor data related to properties (e.g., distance, size, depth, etc.) of objects in at least a portion of a field of view of the sensors.

The screening may also utilize a threshold obstacle detection (e.g., a percentage of the field of view of the cameras and/or the sensors that an obstacle is present) to determine if the obstacle may impact an ability of display free body wearable computing device 50 to capture desirable stereo images.

When obstacle 412 is identified as exceeding the threshold obstacle detection, display free body wearable computing device 50 may actively guide the user to remove the obstacle. To actively guide the user, display free body wearable computing device 50 may use one or more speakers to provide sensory feedback 410C. Sensory feedback 410C may include, for example, a verbal audio cue to remove the obstacle from camera field of view.

Once obstacle 412 is removed from the camera field of view (e.g., the user's hand is lowered), camera 110 may capture a second calibration stereo image to identify that the obstacle has been removed. Display free body wearable computing device 50 may subsequently capture desirable stereo images that may be used to provide computer-implemented services.

Figure 5:
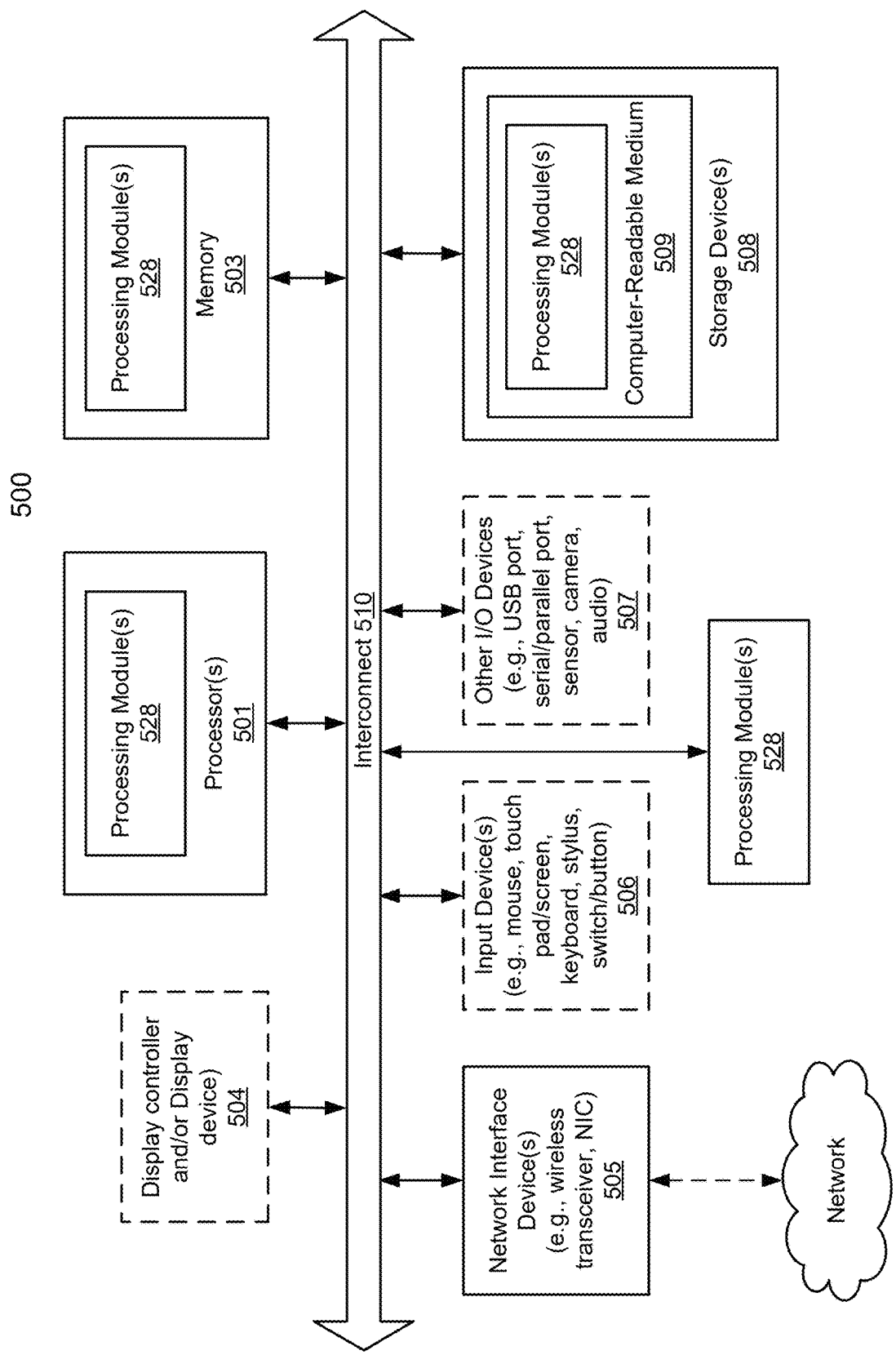
FIG. 5 shows a block diagram illustrating a data processing system in accordance with an embodiment.

Any of the components illustrated in FIGS. 1A-2 may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC).

Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone array to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a display free body wearable computing device, the method comprising:
   identifying that the display free body wearable computing device is being used by a user; and
   based on the identifying:
      obtaining, using at least two image sensors of the display free body wearable computing device, a calibration stereo image;
      screening the calibration stereo image for conditions impacting the display free body wearable computing device that may impair an ability of the display free body wearable computing device to capture desirable stereo images, the conditions comprising a degree of rotation of at least one of the at least two image sensors with respect to the user exceeding a threshold degree of rotation that impairs stitching of images captured by the at least two image sensors;
      in an instance of the screening where the display free body wearable computing device is impacted by at least one of the conditions:
         actively guiding the user using sensory feedback to modify a manner in which the display free body wearable computing device is worn by the user to obtain a repositioned display free body wearable computing device;
         obtaining, using the repositioned display free body wearable computing device, at least one of the desirable stereo images; and
      providing computer-implemented services using the at least one of the desirable stereo images.

2. The method of claim 1, wherein the conditions further comprise:
   a degree of vertical positioning alignment of the at least one of the at least two image sensors with respect to the user exceeding a vertical positioning alignment threshold that impairs stitching of the images captured by the at least two image sensors.

3. The method of claim 2, wherein actively guiding the user comprises:
   in an instance of the screening where the conditions comprise the degree of rotation of the at least one of the at least two image sensors with respect to the user exceeding the threshold degree of rotation that impairs stitching of the images captured by the at least two image sensors:
      generating sensory feedback based instructions for the user to rotate the at least one of the at least two image sensors in a manner that places the degree of rotation of the at least one of the at least two image sensors with respect to the user within the threshold degree of rotation.

4. The method of claim 2, wherein actively guiding the user further comprises:
   in an instance of the screening where the conditions comprise the degree of vertical positioning alignment of the at least one of the at least two image sensors with respect to the user exceeding the vertical positioning alignment threshold that impairs stitching of the images captured by the at least two image sensors:
      generating sensory feedback based instructions for the user to rotate the at least one of the at least two image sensors in a manner that places the degree of vertical positioning alignment of the at least one of the at least two image sensors with respect to the user within the threshold degree of vertical positioning alignment.

5. The method of claim 2, wherein
the conditions further comprise a presence of an obstacle in a field of view of the at least one of the at least two image sensors that precludes capturing of the desirable stereo images, and actively guiding the user further comprises:
in an instance of the screening where the conditions comprise the presence of the obstacle in the field of view of the at least one of the at least two image sensors that precludes the capturing of the desirable stereo images:
generating sensory feedback based instructions for the user to remove the obstacle from the field of view.

6. The method of claim 1, wherein the sensory feedback comprises spatial audio adapted to direct user adjustment of at least one of the at least two image sensors.

7. The method of claim 1, wherein the sensory feedback comprises audio cues adapted to direct user adjustment of at least one of the at least two image sensors.

8. The method of claim 1, wherein the sensory feedback comprises haptic feedback adapted to direct user adjustment of at least one of the at least two image sensors.

9. The method of claim 1, further comprising:
obtaining, using one or more motion sensors installed on the display free body wearable computing device, positioning alignment data of the display free body wearable computing device, the one or more motion sensors being separate from the at least two image sensors; and
performing an image stitching process based on at least the positioning alignment data and the at least one of the desirable stereo images to obtain a desirable stitched image.

10. The method of claim 1, wherein the display free body wearable computing device comprises:
an integrated sensing and interaction component adapted to:
be positioned symmetrically on two portions of a user's head,
be positioned between ears and eyes of the user, and
capture a stereo image of at least a portion of a scene present in a field of view of the user;
an integrated computing, powering, and securing portion; and
an adjustment member adapted to position the integrated sensing and interaction component with respect to the integrated computing, powering, and securing portion.

11. The method of claim 10, wherein the integrated sensing and interaction component comprises:
a pair of cameras;
speakers;
a microphone array; and
a touch pad.

12. The method of claim 11, wherein the integrated sensing and interaction component is adapted to:
obtain the stereo image from the pair of cameras;
at least partially process the stereo image to obtain an image processing result;
identify an action to be performed based, at least in part, on the image processing result and a derived result from a remote entity, the derived result being based, at least in part, on the stereo image and/or the image processing result; and
use at least the speakers to perform the action.

13. The method of claim 11, wherein the pair of cameras comprise lenses configured to:
establish a camera line of sight that is parallel to a line of sight of the user; and
establish a camera field of view that comprises the field of view of the user.

14. The method of claim 11, wherein the stereo image comprises a pair of images of the scene, each of the images being captured at different angles and/or positions with respect to the scene by the pair of cameras.

15. A non-transitory machine-readable medium having instructions stored therein, which when executed by a processor, cause the processor to perform operations for managing operation of a display free body wearable computing device, the operations comprising:
identifying that the display free body wearable computing device is being used by a user; and
based on the identifying:
obtaining, using at least two image sensors of the display free body wearable computing device, a calibration stereo image;
screening the calibration stereo image for conditions impacting the display free body wearable computing device that may impair an ability of the display free body wearable computing device to capture desirable stereo images, the conditions comprising a degree of rotation of at least one of the at least two image sensors with respect to the user exceeding a threshold degree of rotation that impairs stitching of images captured by the at least two image sensors;
in an instance of the screening where the display free body wearable computing device is impacted by at least one of the conditions:
actively guiding the user using sensory feedback to modify a manner in which the display free body wearable computing device is worn by the user to obtain a repositioned display free body wearable computing device;
obtaining, using the repositioned display free body wearable computing device, at least one of the desirable stereo images; and
providing computer implemented services using the at least one of the desirable stereo images.

16. The non-transitory machine-readable medium of claim 15, wherein the conditions further comprise:
a degree of vertical positioning alignment of the at least one of the at least two image sensors with respect to the user exceeding a vertical positioning alignment threshold that impairs stitching of the images captured by the at least two image sensors; and
a presence of an obstacle in a field of view of the at least one of the at least two image sensors that precludes capturing of the desirable stereo images.

17. The non-transitory machine-readable medium of claim 16, wherein actively guiding the user comprises:
in an instance of the screening where the conditions comprise the degree of rotation of the at least one of the at least two image sensors with respect to the user exceeding the threshold degree of rotation that impairs stitching of the images captured by the at least two image sensors:
generating sensory feedback based instructions for the user to rotate the at least one of the at least two image sensors in a manner that places the degree of rotation of the at least one of the at least two image sensors with respect to the user within the threshold degree of rotation.

18. A display free body wearable computing device, comprising:
a processor; and
a memory coupled to the processor to store instructions, which when executed by the processor, cause the processor to perform operations comprising:
identifying that the display free body wearable computing device is being used by a user; and based on the identifying:
  obtaining, using at least two image sensors of the display free body wearable computing device, a calibration stereo image;
  screening the calibration stereo image for conditions impacting the display free body wearable computing device that may impair an ability of the display free body wearable computing device to capture desirable stereo images, the conditions comprising a degree of rotation of at least one of the at least two image sensors with respect to the user exceeding a threshold degree of rotation that impairs stitching of images captured by the at least two image sensors;
  in an instance of the screening where the display free body wearable computing device is impacted by at least one of the conditions:
  actively guiding the user using sensory feedback to modify a manner in which the display free body wearable computing device is worn by the user to obtain a repositioned display free body wearable computing device;
  obtaining, using the repositioned display free body wearable computing device, at least one of the desirable stereo images; and
  providing computer implemented services using the at least one of the desirable stereo images.

19. The display free body wearable computing device of claim 18, wherein the conditions further comprise:
  a degree of vertical positioning alignment of the at least one of the at least two image sensors with respect to the user exceeding a vertical positioning alignment threshold that impairs stitching of the images captured by the at least two image sensors; and
  a presence of an obstacle in a field of view of the at least one of the at least two image sensors that precludes capturing of the desirable stereo images.

20. The display free body wearable computing device of claim 19, wherein actively guiding the user comprises:
  in an instance of the screening where the conditions comprise the degree of rotation of the at least one of the at least two image sensors with respect to the user exceeding the threshold degree of rotation that impairs stitching of the images captured by the at least two image sensors:
  generating sensory feedback based instructions for the user to rotate the at least one of the at least two image sensors in a manner that places the degree of rotation of the at least one of the at least two image sensors with respect to the user within the threshold degree of rotation.

* * * * *